US012790501B2

(12) United States Patent
Knoote et al.

(10) Patent No.: US 12,790,501 B2
(45) Date of Patent: Nov. 10, 2026

(54) VEHICLE WITH IMPROVED LIDAR-DETECTABLE AND RADAR TRANSPARENT COATING

(71) Applicant: Ink Invent IP B.V., Nieuwegein (NL)

(72) Inventors: Jacques Arthur Knoote, Nieuwegein (NL); Paul Willem Mijnen, Nieuwegein (NL); Harald Paul Kerres, Nieuwegein (NL); Philippus Jacob Muis, Nieuwegein (NL); Menno Arthur Knoote, Nieuwegein (NL); Ramon Maria Henricus Schlijper, Nieuwegein (NL); Joost Moerenburg, Nieuwegein (NL)

(73) Assignee: Ink Invent IP B.V., Nieuwegein (NL)

(*) Notice: Subject to any disclaimer, the term of this patent is extended or adjusted under 35 U.S.C. 154(b) by 234 days.

(21) Appl. No.: 18/855,469

(22) PCT Filed: Apr. 13, 2023

(86) PCT No.: PCT/EP2023/059681
§ 371 (c)(1),
(2) Date: Oct. 9, 2024

(87) PCT Pub. No.: WO2023/198829
PCT Pub. Date: Oct. 19, 2023

(65) Prior Publication Data

US 2025/0340744 A1 Nov. 6, 2025

(30) Foreign Application Priority Data

Apr. 13, 2022 (EP) .................................... 22168214
Apr. 12, 2023 (EP) .................................... 23167546

(51) Int. Cl.
*G01S 17/93* (2020.01)
*C09D 5/36* (2006.01)
(Continued)

(52) U.S. Cl.
CPC ................ *C09D 5/36* (2013.01); *C09D 7/62* (2018.01); *C09D 7/69* (2018.01); *C09D 7/70* (2018.01);
(Continued)

(58) Field of Classification Search
None
See application file for complete search history.

(56) References Cited

U.S. PATENT DOCUMENTS 3,228,897 A 1/1966 Nellessen
3,835,087 A 9/1974 Searight et al.
(Continued)

FOREIGN PATENT DOCUMENTS

CN 101668819 A * 3/2010 ....... C04B 35/62897
CN 103038298 A * 4/2013 ............ C08J 7/0427
(Continued)

OTHER PUBLICATIONS

PCT International Search Report, Application No. PCT/EP2023/059681, mailed Jun. 12, 2023, 4 pages.
(Continued)

*Primary Examiner* — Hovhannes Baghdasaryan
(74) *Attorney, Agent, or Firm* — McDonnell Boehnen Hulbert & Berghoff LLP

(57) ABSTRACT

Example embodiments relate to vehicles with improved LIDAR-detectable and radar transparent coatings. One example embodiment includes a vehicle having a frame or coachwork. At least part of the outer surface of the frame or coachwork is covered with a coating. The coating includes at least two layers. The outer two layers are: a basecoat layer and a clearcoat top layer on the basecoat layer. The basecoat layer includes, based on the weight of the basecoat layer: 14.95-98.95 wt. % of binder, 1-85 wt. % of spherical glass beads, 0.05-30 wt. % of pigment flakes that include metallic
(Continued)

pigment flakes or pearlescent pigment flakes, and 0-30 wt. % of further ingredients. The median diameter D50 of the pigment flakes is greater than 35% of the median particle diameter D50 of the spherical glass beads.

20 Claims, 8 Drawing Sheets

(51) Int. Cl.

| | |
|---|---|
| ***C09D 7/40*** | (2018.01) |
| ***C09D 7/62*** | (2018.01) |
| ***G01S 17/931*** | (2020.01) |
| *B60R 13/00* | (2006.01) |
| *C08K 7/20* | (2006.01) |
| *C08K 9/02* | (2006.01) |

(52) U.S. Cl.

CPC ............. *G01S 17/931* (2020.01); *B60R 13/00* (2013.01); *C08K 7/20* (2013.01); *C08K 9/02* (2013.01); *C08K 2201/003* (2013.01); *C08K 2201/005* (2013.01)

(56) References Cited

U.S. PATENT DOCUMENTS

| | | | | |
|---|---|---|---|---|
| 4,082,427 | A | 4/1978 | Nakashima | |
| 6,525,111 | B1 | 2/2003 | Spencer et al. | |
| 2021/0139713 | A1 * | 5/2021 | Wu | C09C 1/3661 |
| 2021/0179856 | A1 | 6/2021 | Schmitt et al. | |

FOREIGN PATENT DOCUMENTS

| | | | | |
|---|---|---|---|---|
| EP | 2 799 398 | B1 | 5/2018 | |
| EP | 3 822 323 | A1 | 5/2021 | |
| EP | 3733802 | B1 * | 7/2025 | C09D 133/08 |
| WO | 03/016964 | A2 | 2/2003 | |
| WO | 2014/109564 | A1 | 7/2014 | |
| WO | 2021/198120 | A1 | 10/2021 | |

OTHER PUBLICATIONS

PCT Written Opinion, Application No. PCT/EP2023/059681, mailed Jun. 12, 2023, 6 pages.

* cited by examiner

VEHICLE WITH IMPROVED LIDAR-DETECTABLE AND RADAR TRANSPARENT COATING

CROSS-REFERENCE TO RELATED APPLICATIONS

The present application is a national stage entry of PCT/EP2023/059681 filed Apr. 13, 2023, which claims priority to EP 22168214.9 filed Apr. 13, 2022 and EP 23167546.3 filed Apr. 12, 2023, the contents of each of which are hereby incorporated by reference.

FIELD OF THE INVENTION

The invention relates to a vehicle with a coating useful in Light Detection and Ranging (LIDAR) technology and in Radio Detection and Ranging (RADAR) technology. The invention further relates to a Laser Imaging Detection And Ranging process of said vehicle and to the use of said vehicle or said coating on a substrate (i) in Laser Imaging Detection And Ranging of said vehicle or of said coating on a substrate, (ii) to improve the visibility of said vehicle or of said coating on a substrate under visible light conditions and/or (iii) to prepare a 3-dimensional image of said vehicle or of said coating on a substrate. The invention further relates to a Radio Detection and Ranging process and to the use of spherical glass beads as a transparency improver for radio waves in a coating layer.

BACKGROUND OF THE INVENTION

Vehicles, such as cars, bikes, motorcycles and scooters, are typically provided with a clearcoat top layer to protect them, for example against oxidation or weathering, and to provide the overall coating with a glossy appearance. This glossy clearcoat top layer may be appealing from an aesthetic point of view but it deteriorates the detectability of the vehicle using Light Detection and Ranging (LIDAR) technology. For a proper determination of the distance to a vehicle or the exact contours of a vehicle under different viewing angles with LIDAR technology, increased Lambertian reflectance of electromagnetic radiation at LIDAR wavelengths is preferred over specular reflection or retroreflection, due to the disturbing influence of 100% specular or 100% retroreflection. Lambertian reflectance is the property that defines an ideal matte or diffusely reflecting surface. In this respect, reference is made to A. Höpe, *Experimental Methods in the Physical Sciences,* 46, Chapter 6-Diffuse Reflectance and Transmittance, 2014, pp 179-219, which is herein incorporated by reference in its entirety. The apparent brightness of a Lambertian surface to an observer is the same regardless of the observer's angle of view. By definition, 100% Lambertian reflectance defines the whitest white, i.e. the most visible color.

WO03/016964A2 discloses a retroreflective coating system that includes retroreflective microspheres for wet-on-wet application to an automotive body panel. It is described that the retroreflective coating system provides satisfactory gloss and retroreflectivity and optimally enhances the visibility to others to ensure safety. FIG. 4 of WO03/016964A2 depicts an embodiment wherein a substrate is covered with a basecoat layer BC comprising binder, retroreflective microspheres and pigments with a clearcoat layer CC on top of the basecoat layer.

RADAR sensors are used in vehicles for adaptive cruise control and for blind-spot, lane-change and cross-traffic assistants. RADAR sensors for acquisition of the surroundings are key components for future vehicles with semi-autonomous and fully autonomous driving functionalities. Autonomous driving requires RADAR technology that reliably detects objects in the surrounding area. Automotive RADAR sensors are usually integrated invisibly behind vehicle bumpers. Vehicle bumpers are typically made of plastic with a metallic coating layer thereon, often in the same colour as the remaining part of the coachwork, comprising metal flake pigments, such as for example aluminium flake pigments. The presence of these metal flake pigments adversely affects the transparency of the coating for RADAR signals.

It is an object of the invention to provide glossy coatings for vehicles that provide improved LIDAR detectability.

It is an object of the invention to provide glossy coatings for vehicles that provide improved transparency to RADAR signals.

It is a further object of the invention to provide glossy coated substrates that provide improved LIDAR detectability.

It is a further object of the invention to provide glossy coated substrates that provide improved transparency to RADAR signals.

It is another object of the invention to improve LIDAR detectability of vehicles.

SUMMARY OF THE INVENTION

The inventors have unexpectedly established that one or more of the objectives can be met by using a coating comprising retroreflective microspheres and pigment flakes with high aspect ratio, particularly when the ratio of the median diameter D50 of said pigment flakes is greater than 35% of the median particle diameter D50 of said retroreflective microspheres.

Accordingly, in a first aspect, the invention provides a vehicle having a frame or coachwork, wherein at least part of the outer surface of the frame or coachwork is covered with a coating, said coating comprising at least two layers, wherein the outer two or three layers are:

(a) a basecoat layer;

(b) optionally a tinted clearcoat layer on (a);

(c) a clearcoat top layer on (a) or on (b);

wherein the basecoat layer (a) consists of, based on the weight of said basecoat layer (a):

- 14.95-98.95 wt. % of binder;
- 1-85 wt. % of spherical glass beads having a median particle diameter D50, as measured with laser diffraction, between 1 and 150 μm, and having a refractive index, measured at a wavelength λ of 589 nm, between 1.7 and 2.8;
- 0.05-30 wt. % of pigment flakes chosen from the group consisting of metallic pigment flakes, pearlescent pigment flakes or a combination thereof, said pigment flakes having a median diameter D50, as measured with laser diffraction, between 1 and 75 μm, a thickness smaller than 1 μm and an aspect ratio (flake diameter/thickness) of at least 10; and
- 0-30 wt. % of further ingredients, wherein the median diameter D50 of said pigment flakes is greater than 35% of the median particle diameter D50 of said spherical glass beads.

The inventors have found that a vehicle with this coating has improved LIDAR detectability, particularly at increased angles of incidence, i.e. at increased angles from normal incidence. In other words, the coating improves not only the frontal view of the vehicle, but rather the whole LIDAR scannable contours of the vehicle.

Moreover, the inventors have found that a vehicle with this coating has improved transparency for RADAR signals, as compared to similar coatings not comprising the spherical glass beads. For example, a plastic bumper, as part of the frame or coachwork of the vehicle, covered with this coating has improved transparency for RADAR signals, as compared to a plastic bumper covered with a similar coating not comprising the spherical glass beads.

In a second aspect, the invention provides a process of Laser Imaging Detection And Ranging (LIDAR) of the vehicle as defined herein, said process comprising the steps of:

(i) providing a LIDAR device comprising a source of electromagnetic radiation, a receiver and optionally a Global Positioning System (GPS);
(ii) transmitting electromagnetic radiation from the source of electromagnetic radiation of the LIDAR device to the vehicle;
(iii) scanning the electromagnetic radiation reflected by the coating of the vehicle by the receiver of the LIDAR device; and
(iv) computing from the differences between the transmitted electromagnetic radiation and the scanned reflected electromagnetic radiation, preferably as a function of time, one or more of:
  - the distance between the vehicle and the LIDAR device;
  - the acceleration of the vehicle;
  - the deceleration of the vehicle;
  - the direction of movement of the vehicle;
  - the speed of the vehicle, preferably the speed of the vehicle relative to that of the LIDAR device; and
  - a 3D image of the vehicle.

In a third aspect, the invention provides the use of the vehicle as defined herein or a coated substrate comprising at least two layers of which the outer two or three layers are:

(a) a basecoat layer;
(b) optionally a tinted clearcoat layer on (a);
(c) a clearcoat top layer on (a) or on (b);

wherein the basecoat layer (a) consists of, based on the weight of said basecoat layer (a):
  - 14.95-98.95 wt. % of binder;
  - 1-85 wt. % of spherical glass beads having a median particle diameter D50, as measured with laser diffraction, between 1 and 150 μm, and having a refractive index, measured at a wavelength λ of 589 nm, between 1.7 and 2.8;
  - 0.05-30 wt. % of pigment flakes chosen from the group consisting of metallic pigment flakes, pearlescent pigment flakes or a combination thereof, said pigment flakes having a median diameter D50 between 1 and 75 μm, as measured with laser diffraction, a thickness smaller than 1 μm and an aspect ratio (flake diameter/thickness) of at least 10; and
  - 0-30 wt. % of further ingredients, wherein the median diameter D50 of said pigment flakes is greater than 35% of the median particle diameter D50 of said spherical glass beads,
  - in Laser Imaging Detection And Ranging (LIDAR) of said vehicle or of said coated substrate; and/or.
  - to improve the visibility of said vehicle or of said coated substrate under visible light conditions; and/or
  - to prepare a 3-dimensional image of said vehicle or of said coated substrate.

DEFINITIONS

Figure 1A:
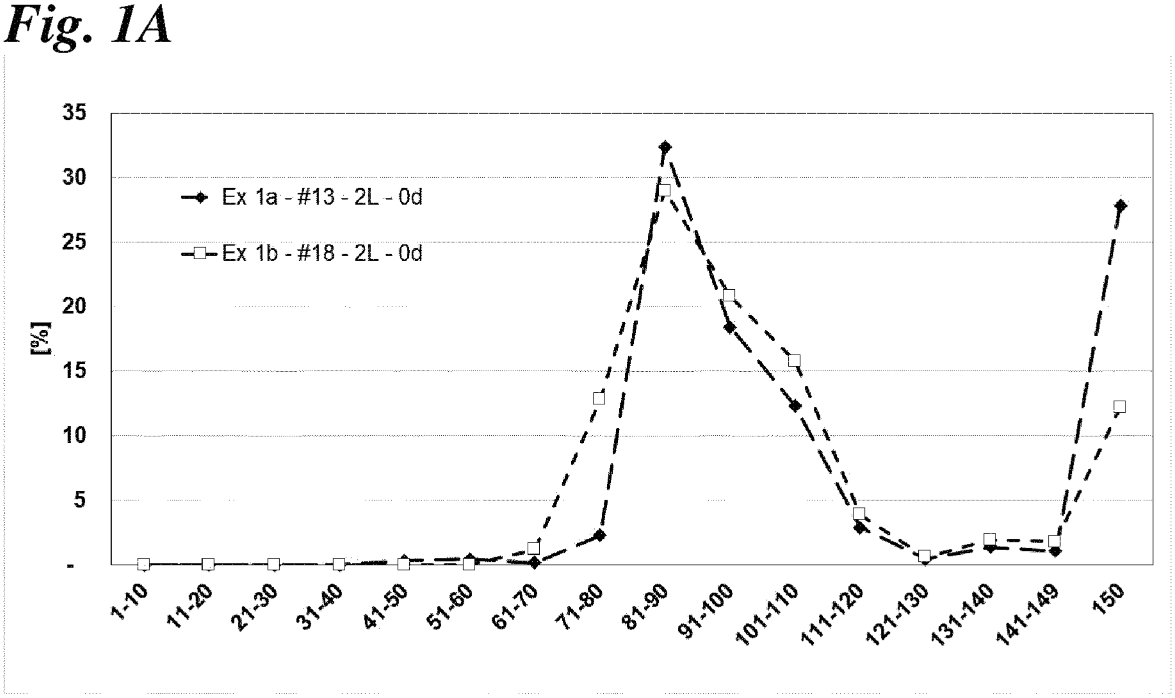
FIGS. 1A to 1F, 2A to 2E, and 3A to 3D depict LIDAR test results of coated substrates.

The term 'pigment' as used herein refers to particulate colorants, such as spherical parts or flakes. They are insoluble in the binder or solvent used.

The term 'dye' as used herein refers to colorants that can be molecularly dissolved in the binder or solvent used.

The term 'colorant' as used herein includes pigments as well as dyes.

The term 'titanium suboxides' as used herein refers to titanium oxide compound with the formula $Ti_nO_{2n-1}$, wherein n is an integer greater than 1.

The term 'LIDAR' is an acronym of 'light detection and ranging' or 'laser imaging, detection, and ranging' and concerns a method for determining ranges (variable distance) to an object, speed of an object and 3D-representations of an object by targeting the object with electromagnetic radiation, typically laser light, and measuring the time for the reflected electromagnetic radiation to return to a receiver.

The term 'RADAR' is an acronym of 'radio detection and ranging' and concerns a method for determining the distance, angle and radial velocity of objects by targeting the objects with radio waves, and measuring the time for the reflected radio waves to return to a receiver.

DETAILED DESCRIPTION

Vehicle

In a first aspect, the invention concerns a vehicle having a frame or coachwork, wherein at least part of the outer surface of the frame or coachwork is covered with a coating, said coating comprising at least two layers, wherein the outer two or three layers are:

(a) a basecoat layer;
(b) optionally a tinted clearcoat layer on (a);
(c) a clearcoat top layer on (a) or on (b);

wherein the basecoat layer (a) consists of, based on the weight of said basecoat layer (a):
  - 14.95-98.95 wt. % of binder or resin;
  - 1-85 wt. % of spherical glass beads having a median particle diameter D50, as measured with laser diffraction, between 1 and 150 μm, and having a refractive index, measured at a wavelength λ of 589 nm, between 1.7 and 2.8;
  - 0.05-30 wt. % of pigment flakes chosen from the group consisting of metallic pigment flakes, pearlescent pigment flakes or a combination thereof, said pigment flakes having a median diameter D50 between 1 and 75 μm, as measured with laser diffraction, a thickness smaller than 1 μm and an aspect ratio (flake diameter/thickness) of at least 10; and
  - 0-30 wt. % of further ingredients, wherein the median diameter D50 of said pigment flakes is greater than 35% of the median particle diameter D50 of said spherical glass beads.

As will be appreciated by those skilled in the art, the wording 'the basecoat layer (a) consists of' means that the combined amounts of binder/resin, spherical glass beads, pigment flakes and further ingredients add up to 100 wt. % of the basecoat layer (a).

The term 'vehicle' as used herein refers to a physical object used for transporting people or goods. Non-limiting examples of vehicles in the context of this invention are chosen from the group consisting of cars, lorries, trucks, bikes, mopeds, scooters, motorcycles, trains, trams, boats, ships, drones, skateboards, missiles, helicopters and aircrafts. In a preferred embodiment, the vehicle is chosen from cars, lorries, trucks, bikes, mopeds, scooters and motorcycles.

The part of the outer surface of the frame or coachwork to which the coating is applied may for example be a metallic part, a carbon fiber part, a composite part, a plastic part, a truck tarpaulin or canvas and combinations thereof.

The part of the outer surface of the frame or coachwork to which the coating is applied may for example be a metallic outer surface, a carbon fiber outer surface, a composite outer surface, a plastic outer surface, a truck tarpaulin or canvas and combinations thereof.

In an embodiment, the part of the outer surface of the frame or coachwork to which the coating is applied is a plastic part. In another embodiment, the part of the outer surface of the frame or coachwork to which the coating is applied is a plastic part and the pigment flakes are chosen from the group consisting of metallic pigment flakes.

In an embodiment, the coating is applied to at least part of the outer surface of a plastic part of the frame or coachwork. In another embodiment, the coating is applied to at least part of the outer surface of a plastic part of the frame or coachwork and the pigment flakes are chosen from the group consisting of metallic pigment flakes.

In an embodiment, at least part of the frame or coachwork is made of plastic and at least part of the outer surface thereof (i.e. of the part of the frame or coachwork made of plastic) is covered with the coating. In another embodiment, at least part of the frame or coachwork is made of plastic and at least part of the outer surface thereof (i.e. of the part of the frame or coachwork made of plastic) is covered with the coating and the pigment flakes are chosen from the group consisting of metallic pigment flakes.

In an embodiment, more than 1%, preferably more than 10%, more preferably more than 30%, even more preferably more than 50%, still more preferably more than 75%, yet more preferably more than 90% of the outer surface of the frame or coachwork is covered with the coating. In an embodiment, the complete outer surface of the frame or coachwork is covered with the coating.

Coating

As defined hereinbefore, at least part of the outer surface of the frame or coachwork of the vehicle is covered with a coating, said coating comprising at least two layers, wherein the outer two or three layers are (a) a basecoat layer, optionally (b) a tinted clearcoat layer on (a) and (c) a clearcoat top layer on (a) or (b). Although only the outer two or three layers of the coating have been defined, the coating can also comprise further layers between the outer surface of the frame or coachwork and the basecoat layer (a).

When for example at least part of the frame or coachwork of a 'ready-to-use vehicle' is provided with the at least two outer layers as defined hereinbefore, the outer surface of the frame or coachwork will typically already contain a primer layer, one or more 'first' basecoat layers different from basecoat layer (a) and one or more (tinted) clearcoat (top) layers. The at least two outer layers as defined hereinbefore are then applied on top of the already present layers.

Accordingly, in an embodiment, said coating comprises the following layers in the following order:

(i) optionally one or more primer layers on the outer surface of the frame or coachwork;
(ii) optionally one or more 'first' basecoat layers different from basecoat layer (a) on the outer surface of the frame or coachwork or on (i);
(iii) optionally one or more clearcoat layers and/or tinted clearcoat layers on the outer surface of the frame or coachwork, on (i) or on (ii);
(iv) the basecoat layer (a) on the outer surface of the frame or coachwork, on (i), on (ii) or on (iii);
(v) optionally a tinted clearcoat layer (b) on basecoat layer (a); and
(vi) the clearcoat top layer (c) on basecoat layer (a) or on tinted clearcoat layer (b).

Said coating can also be applied to a sticker, which is subsequently applied onto at least part of the outer surface of the frame or coachwork or, if present, onto at least part of the outer coating layer of the different coating layers already present on a ready-to-use vehicle.

The term 'primer layer' is well known in the art of paints or coatings for vehicles and concerns an adhesion layer between the substrate to be coated, i.e. the outer surface of the frame or coachwork, and the basecoat layer (a) or the 'first' basecoat layer. A primer layer is typically applied if the adhesion between the substrate to be coated and the basecoat layer is insufficient. Accordingly, whether a primer layer is useful or even mandatory depends on both the nature of the outer surface of the frame or coachwork and the nature of the basecoat layer.

The basecoat layer (a) can be the only colour-providing layer of the coating. In an embodiment, the colour is provided only by the metallic pigment flakes, pearlescent pigment flakes or the combination thereof. However, the basecoat layer (a) can also comprise further colouring agents such as dyes, organic pigments and inorganic pigments, different from the metallic pigment flakes and pearlescent pigment flakes as defined herein.

If a 'first' basecoat layer is present under the basecoat layer (a), this layer typically is a coloured basecoat layer. The first basecoat layer can comprise metallic pigment flakes, pearlescent pigment flakes, dyes, organic pigments, inorganic pigments and combinations thereof. The 'first' basecoat layer typically does not comprise spherical glass beads.

The clearcoat top layer (c) and the tinted clearcoat layer (b) can encompass two or more (tinted) clearcoat (top) layers that are applied on top of each other in subsequent steps. The basecoat layer (a) can also encompass two or more basecoat layers that are applied on top of each other in subsequent steps, with the proviso that the overall basecoat layer (a) meets the requirements as defined herein.

The terms 'clearcoat top layer' and 'clearcoat layer' are well known in the art of paints or coatings for vehicles and concern a transparent layer, typically without dyes and pigments, that covers a coloured basecoat layer. Clearcoat top layers are applied for different purposes, such as the prevention of oxidation or weathering of the basecoat layer and/or to provide the overall coating with a glossy appearance. In a preferred embodiment, the clearcoat top layer (c) does not comprise dyes and pigments. In a preferred embodiment, the clearcoat top layer (c) does not comprise spherical glass beads. The term 'tinted clearcoat layer' refers to a coloured clearcoat composition, which is transparent and typically comprises dyes, nanoscale pigments and/or pigment flakes. In a preferred embodiment, the tinted clearcoat layer (b) does not comprise spherical glass beads.

Generally, the types of clearcoat compositions suitable for application in the coating include solvent-based and aqueous clearcoat compositions, powder and powder slurry clearcoat compositions, and thermosetting and thermoplastic clearcoat compositions. The clearcoat composition can be radiation curable. If the clearcoat composition is radiation curable, it can comprise a curing initiator, such as a photoinitiator or a thermal initiator.

In a preferred embodiment, the total thickness of the basecoat layer (a) is between 1 and 300 μm, more preferably between between 2 and 75 μm, even more preferably between 3 and 50 μm, still more preferably between 4 and 40 μm, yet more preferably between 5 and 20 μm. The total thickness of the basecoat layer (a) is typically not smaller than the median particle diameter D90 of the spherical glass beads.

In a preferred embodiment, the spherical glass beads in basecoat layer (a) have a median particle diameter D50, as measured with laser diffraction, between 1 and 25 μm, and have a refractive index, measured at a wavelength λ of 589 nm, between 1.9 and 2.6; the pigment flakes chosen from the group consisting of metallic pigment flakes, pearlescent pigment flakes or a combination thereof, have a median diameter D50, as measured with laser diffraction, between 2 and 75 μm, a thickness smaller than 1 μm and an aspect ratio (flake diameter/thickness) of at least 10; and the median diameter D50 of said pigment flakes is greater than 35% of the median particle diameter D50 of said spherical glass beads.

In a very preferred embodiment, the spherical glass beads in basecoat layer (a) have a median particle diameter D50, as measured with laser diffraction, between 1 and 15 μm, and have a refractive index, measured at a wavelength λ of 589 nm, between 2.0 and 2.3; the pigment flakes chosen from the group consisting of metallic pigment flakes, pearlescent pigment flakes or a combination thereof, have a median diameter D50, as measured with laser diffraction, between 3 and 75 μm, a thickness smaller than 1 μm and an aspect ratio (flake diameter/thickness) of at least 10; and the median diameter D50 of said pigment flakes is greater than 45% of the median particle diameter D50 of said spherical glass beads.

The inventors have established that the improved Lidar detectability of the present coating is more pronounced when the coating is a metallic coating and/or has a dark colour.

Binder or Resin

Suitable binders and resins for application in vehicle coatings are generally known to the skilled person. The suitability of the type of binders and resins not only depends on their expected resistance to wear but typically also on the way of applying the precursor of the basecoat (a) layer to the vehicle. Precursor basecoat layer (a) compositions that are applied in a water-based or aqueous form on the one hand and precursor basecoat layer (a) compositions that are applied based on organic solvents on the other hand typically require different binders and resins. Suitable binders and resins for both types of compositions are well known to the skilled person. The binder or resin can be radiation curable. If the binder or resin is radiation curable, the further ingredients can comprise a curing initiator, such as a photoinitiator or a thermal initiator.

Spherical Glass Beads

As defined hereinbefore, the basecoat layer (a) comprises spherical glass beads. In preferred embodiments, the term 'glass' in 'spherical glass beads' as used herein refers to non-crystalline, amorphous solid and transparent material made of oxides. In other embodiments, the term 'glass' in 'spherical glass beads' refers to solid and transparent material made of oxides and containing some microcrystallinity. The refractive index of the spherical glass beads is closely related to the density of the glass, although the relationship is not linear. Because of the nature of glass, the density is approximately an additive function of its composition. Densities of spherical glass beads having refractive indices between 1.5 and 2.8 typically vary between 2.5 and 4.5 g/cm$^3$.

In a preferred embodiment, the spherical glass beads have a refractive index, measured at a wavelength λ of 589 nm, of between 1.9 and 2.6, preferably between 2.0 and 2.3.

In another embodiment, the spherical glass beads as defined herein comprise at least two types of spherical glass beads.

Oxides that can be used in glass are oxides of silicon, boron, aluminium, sodium, barium, vanadium, titanium, lanthanum, strontium, zirconium, potassium, magnesium, iron, calcium, zinc, lithium, barium and lead. The spherical glass beads can for example comprise different combinations of silica ($SiO_2$), boric oxide ($B_2O_3$), phosphorous pentoxide ($P_2O_5$), vanadium pentoxide ($V_2O_5$), arsenic trioxide ($As_2O_3$), germanium oxide ($GeO_2$), calcium oxide (CaO), sodium oxide ($Na_2O$), magnesium oxide (MgO), zinc oxide (ZnO), aluminium oxide ($Al_2O_3$), potassium oxide ($K_2O$), iron oxide ($Fe_2O_3$), lead oxide (PbO), barium oxide (BaO), barium titanate ($BaTiO_3$), titanium oxide ($TiO_2$), lithium oxide ($Li_2O$), strontium oxide (SrO), lanthanum oxide ($La_2O_3$), and zirconium oxide ($ZrO_2$). Silica and boric oxide are generally the lowest in density. Glasses containing large weight percentages of these oxide therefore generally result in glass beads with low refractive indices. The refractive indices can be increased by adding oxides with higher molecular weights. Preferably, the spherical glass beads do not comprise PbO.

Glass beads having refractive indices in the range of 1.5-2.51 and their composition in terms of oxides are disclosed in WO2014/109564A1, which is incorporated herein by reference in its entirety. PbO-free transparent glass beads with refractive indices of above 2.15 are disclosed in U.S. Pat. No. 4,082,427, which is incorporated herein by reference in its entirety.

The spherical glass beads may be coloured spherical glass beads as long as they remain transparent. Both coloured spherical glass beads made from coloured transparent glass and spherical glass beads provided with a concentric transparent coloured coating are encompassed by the invention. The colour may be the natural colour caused by the composition of the oxides or may be deliberately chosen by adding ingredients having a specific colour. Coloured glass beads having high refractive indices and high transparency are disclosed in WO2014/109564A1.

Accordingly, in an embodiment, at least part of the spherical glass beads are spherical glass beads made from coloured transparent glass and/or at least part of the spherical glass beads is provided with a concentric transparent coloured coating.

The spherical glass beads have a median particle diameter D50, as measured with laser diffraction. Accordingly, the median particle diameter D50 is a volume median, based on a volume distribution. The median particle diameter D50 is the diameter where half of the population of spherical glass beads lies below. This volume median particle diameter is often referred to in the art as Dv50 or $D_{v0.5}$.

In a preferred embodiment, the spherical glass beads have a median particle diameter D50, as measured with laser diffraction, between 1.5 and 100 μm, more preferably between 2 and 50 μm, even more preferably between 2.5 and 20 μm, still more preferably between 3 and 10 μm, such as between 3 and less than 10 μm or between 3 and less than 9.5 μm.

In another embodiment, the spherical glass beads have a median particle diameter D50, as measured with laser diffraction, between 10 and 150 μm, such as between 15 and 150 μm, between 20 and 150 μm, between 25 and 150 μm, between 30 and 150 μm or between 35 and 150 μm.

In a very preferred embodiment, the spherical glass beads have a median particle diameter D50, as measured with laser diffraction, between 1 and 100 μm, such as between 1 and 75 μm, between 1 and 50 μm, between 1 and 45 μm, between 1 and 40 μm, between 1 and 35 μm, between 1 and 30 μm, between 1 and 25 μm, between 1 and 20 μm, between 1 and 15 μm, between 1 and 10 μm, between 1 and less than 10 μm, between 1 and 9.5 μm, between 1 and 9 μm or between 1 and 8.

In a preferred embodiment, the spherical glass beads have a median particle diameter D50, as measured with laser diffraction, between 5 and 100 μm, more preferably between 5 and 75 μm, even more preferably between 5 and 50 μm, such as between 5 and 45 μm, between 5 and 40 μm, between 5 and 35 μm, between 5 and 30 μm, between 5 and 25 μm, between 5 and 20 μm or between 5 and 15 μm.

The diameters D10 and D90 are often referred to in the art as Dv10 or $D_{v0.1}$ and Dv90 or $D_{v0.9}$, respectively. The D10 diameter is the diameter where 10% of the population of spherical glass beads lies below. Similarly, the D90 diameter is the diameter where 90% of the population of spherical glass beads lies below.

The span, as measured by laser diffraction, of the particle size distribution of the spherical glass beads is defined by:

$$\text{span} = \frac{D90 - D10}{D50}$$

In another embodiment, the spherical glass beads have a median particle diameter D50, as measured with laser diffraction, between 1 and 100 μm and a span between 0 and 1.9, preferably between 0 and 1.5, more preferably between 0 and 1, even more preferably between 0 and 0.5, such as between 0 and 0.2 or between 0 and 0.1.

In a preferred embodiment, the spherical glass beads have a median particle diameter D50, as measured with laser diffraction, between 1 and 50 μm and a span between 0 and 1.9, preferably between 0 and 1.5, more preferably between 0 and 1, even more preferably between 0 and 0.5, such as between 0 and 0.2 or between 0 and 0.1.

In another preferred embodiment, the spherical glass beads have a median particle diameter D50, as measured with laser diffraction, between 1 and 25 μm and a span between 0 and 1.9, preferably between 0 and 1.5, more preferably between 0 and 1, even more preferably between 0 and 0.5, such as between 0 and 0.2 or between 0 and 0.1.

In yet another preferred embodiment, the spherical glass beads have a median particle diameter D50, as measured with laser diffraction, between 1 and 15 μm and a span between 0 and 1.9, preferably between 0 and 1.5, more preferably between 0 and 1, even more preferably between 0 and 0.5, such as between 0 and 0.2 or between 0 and 0.1.

In still another preferred embodiment, the spherical glass beads have a median particle diameter D50, as measured with laser diffraction, between 1 and 10 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 1 and less than 10 μm and a span between 0 and 1.9, such as between 0 and 1.5, between 0 and 1, between 0 and 0.5, between 0 and 0.2 or between 0 and 0.1.

In still another preferred embodiment, the spherical glass beads have a median particle diameter D50, as measured with laser diffraction, between 1 and 8 μm and a span between 0 and 1.9, such as between 0 and 1.5, between 0 and 1, between 0 and 0.5, between 0 and 0.2 or between 0 and 0.1.

As will be appreciated by those skilled in the art, span=0 corresponds to monodisperse spherical glass beads.

In a preferred embodiment, the spherical glass beads are not hemispherically coated with a light-reflective coating, such as for example hemispherical aluminium coating (HAC).

In an embodiment, at least part of the spherical glass beads is fluoro-chemically coated. In another embodiment, at least part of the spherical glass beads is silane coated. In another embodiment, at least part of the spherical glass beads is silicone coated.

In a preferred embodiment, the amount of the spherical glass beads is 1.5-80 wt. %, more preferably 2-70 wt. %, even more preferably 3-65 wt. %, based on the weight of the basecoat layer (a).

In embodiments, the amount of the spherical glass beads is 1-80 wt. %, 1-75 wt. %, 1-70 wt. %, 1-65 wt. %, 1-60 wt. %, 1-55 wt. %, 1-50 wt. %, 1-45 wt. %, 1-40 wt. %, 1-35 wt. %, 1-30 wt. %, 1-25 wt. %, 1-20 wt. %, 1-15 wt. % or 1-10 wt. %, based on the weight of the basecoat layer (a).

In other embodiments, the amount of the spherical glass beads is 2-85 wt. %, 5-85 wt. %, 10-85 wt. %, 15-85 wt. %, 20-85 wt. %, 25-85 wt. % or 30-85 wt. %, based on the weight of the basecoat layer (a).

Pigment Flakes

The basecoat layer (a) comprises between 0.05 and 30 wt. % of pigment flakes chosen from the group consisting of metallic pigment flakes, pearlescent pigment flakes or a combination thereof, based on the weight of the basecoat layer (a), said pigment flakes having a median diameter D50, as measured with laser diffraction, between 1 and 75 μm, a thickness smaller than 1 μm and an aspect ratio (flake diameter/thickness) of at least 10.

In an embodiment, the pigment flakes are chosen from the group consisting of metallic pigment flakes.

Metallic pigment flakes and pearlescent pigment flakes constitute the two main types of (flake-like) special effect pigments. Metallic pigment flakes, also called metal effect pigment flakes, consist of flake-shaped metallic particles, used to give products metallic effect colour or functional properties like anti-corrosion, heat resistance and conductivity. The small metal platelets behave like mirrors and can reflect incident light. Pearlescent pigment flakes simulate the luster of natural pearls and give the materials additional colour effects, such as angular colour dependence. Pearlescent pigments typically have several layers of materials with different refractive indices. Thin flakes of materials with low refractive indices, such as mica, silica, alumina or glass, are typically used as substrates and they are coated with high refractive materials. Substrate-free pearlescent pigment flakes are however also encompassed by the invention.

In a preferred embodiment, the pearlescent pigment flakes have several layers of materials with different refractive indexes, wherein low refractive index material, such as mica, silica, alumina or glass, is used as substrate and wherein the substrate is coated with a material of a higher refractive index.

Aspect Ratio

The terms 'flake' or 'platelet' as used herein refers to the shape of pigments having a large surface area and a small thickness. Typically, flakes or platelets are characterized by their 'aspect ratio', being defined as the largest dimension, i.e. the largest diameter of the surface, divided by the smallest dimension, i.e. the thickness.

The pigment flakes as used herein have an aspect ratio of at least 10, preferably at least 15, more preferably at least 20, even more preferably at least 30.

In an embodiment, the pigment flakes as used herein have an aspect ratio of between 10 and 500, preferably between 15 and 250, more preferably between 20 and 100.

Median Diameter of the Pigment Flakes

In a preferred embodiment, the median diameter of the pigment flakes is 1.5-65 μm, more preferably 2-50 μm, even more preferably 2.5-40 μm, still more preferably 3-35 μm, most preferably 4-30 μm.

In another preferred embodiment, the median diameter of the pigment flakes is 1-65 μm, such as 1-50 μm, 1-40 μm, 1-35 μm, 1-25 μm, 1-20 μm, 1-15 μm or 1-13 μm.

In another embodiment, the median diameter of the pigment flakes is 1.5-75 μm, such as 3-75 μm, 5-75 μm, 7-75 μm, 9-75 μm or 11-75 μm.

Thickness of the Pigment Flakes

In a preferred embodiment, the thickness of the pigment flakes is between 10 nm and 950 nm, more preferably between 15 nm and 850 nm, even more preferably between 50 nm and 650 nm.

In another preferred embodiment, the thickness of the pigment flakes is between 10 nm and 200 nm, such as between 10 nm and 150 nm, between 10 nm and 100 nm or between 10 and 50 nm.

In another preferred embodiment, the thickness of the pigment flakes is between 200 nm and 980 nm, such as between 300 nm and 980 nm, between 400 nm and 980 nm or between 500 nm and 980 nm.

Types of Pigment Flakes

In a preferred embodiment, the pigment flakes as defined herein are chosen from (A), (B), (C) or a combination thereof:

(A) Metal flakes or mica flakes, optionally coated with at least one layer of one or more components chosen from the group consisting of metal oxides, metals, metal sulphides, titanium suboxides, titanium oxynitrides, FeO(OH), $SiO_2$, $B_2O_3$, $GeO_2$, $MgF_2$, metal alloys, rare earth compounds, and optionally coated with an outer layer comprising one or more colorants and a binder;

(B) Flakes comprising $Al_2O_3$, $SiO_2$, glass, ceramics, graphite or mica platelets coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colorants and a binder; and (C) Flakes comprising $Al_2O_3$ platelets doped with one or more components chosen from the group consisting of $TiO_2$, $ZrO_2$, $SiO_2$, $SnO_2$, $In_2O_3$, ZnO and iron oxide, coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colorants and a binder.

In a preferred embodiment, the pigment flakes are synthetic pigment flakes. As will be appreciated by those skilled the art, the term 'synthetic' in 'synthetic pigment flakes' means that the pigment flakes are not pigment flakes naturally occurring, but they are pigment flakes that have been chemically manufactured or naturally occurring pigment flakes that have been chemically/physically processed. One of the advantages of using synthetic pigment flakes is that they can be produced with very smooth surfaces and high aspect ratios, thereby increasing their reflective properties.

Pigment flakes (A) can have zero to multiple coating layers, such as 1, 2, 3, 4 or 5 coating layers.

In an embodiment, the metal in the metal pigment flakes (A) is chosen from the group consisting of aluminium, silver and gold, preferably aluminium. In an embodiment, metal pigment flakes (A) are aluminium flakes without any coating. Examples of aluminium pigment flakes (A) without any coating include Decomet® aluminium flakes (Schlenk, Germany). Decomet® aluminium pigment flakes typically have a median diameter (D50) of between 10 and 15 μm and a thickness of <50 nm.

In an embodiment, pigment flakes (A) are mica flakes without any coating.

In an embodiment, pigment flakes (A) are mica flakes with several coating layers, such as mica flakes coated with $TiO_2$, $Fe_2O_3$ and $SnO_2$. Examples include Iriodin® Silver-Grey SW pigment flakes (Merck, Germany).

In an embodiment, metal pigment flakes (A) are aluminium pigment flakes coated with at least one layer of one or more components chosen from the group consisting of metal oxides, $SiO_2$, $B_2O_3$, and $GeO_2$. In an embodiment, metal pigment flakes (A) are aluminium flakes coated with an $SiO_2$ layer.

Examples of suitable aluminium pigment flakes (A) coated with an $SiO_2$ layer are Aquamet® aluminium flakes (Schlenk, Germany). Aquamet® aluminium flakes typically have a median diameter (D50) of between 5 and 50 μm and a thickness of between 20 nm and 1 μm.

Examples of suitable aluminium pigment flakes (A) coated with $MgF_2$ are SpectraFlair pigments (VIAVI Solutions Inc., USA), typically having a median diameter (D50) of between 14 and 35 μm and a thickness of between 250 nm and 900 nm.

In an embodiment, flakes (A) are coated with a $SiO_2$ layer and with an outer layer comprising one or more colorants and a binder for fixation of the one or more colorants. Examples of suitable aluminium pigment flakes (A) coated with an $SiO_2$ layer and with an outer layer comprising one or more colorants and a binder are Toyal flakes (Toyo Aluminium K.K., Japan). Toyal flakes may have a median diameter (D50) of about 10 μm and a thickness of less than 1 μm, such as about 100 nm.

Examples of metal oxides that can be applied in a coating layer on metal pigment flakes (A) are chosen from the group consisting of $TiO_2$, $ZrO_2$, $SnO_2$, ZnO, $MnO_2$, MgO, $Ce_2O_3$, $Fe_2O_3$, $Fe_3O_4$, $FeTiO_5$, $Cr_2O_3$, CoO, $CO_3O_4$, $VO_2$, $V_2O_3$, NiO and combinations thereof.

Examples of suitable aluminium pigment flakes (A) coated with (i) a first layer consisting of $SiO_2$, $B_2O_3$, $MnO_2$, MgO, $GeO_2$ or $Al_2O_3$, (ii) a second $Fe_2O_3$ layer on top of the first layer and optionally (iii) a third layer of $TiO_2$, $ZrO_2$, or $Al_2O_3$ on top of the second layer are disclosed in US2019/044679A1, which is incorporated herein by reference in its entirety.

Pigment flakes (B) and (C) can have one to multiple coating layers, such as 2, 3, 4 or 5 coating layers.

Examples of metal oxides that can be applied in a coating layer on metal pigment flakes (A) are chosen from the group consisting of $TiO_2$, $ZrO_2$, $SnO_2$, ZnO, $MnO_2$, MgO, $Ce_2O_3$, $Fe_2O_3$, $Fe_3O_4$, $FeTiO_5$, $Cr_2O_3$, CoO, $CO_3O_4$, $VO_2$, $V_2O_3$, NiO and combinations thereof.

In an embodiment, pigment flakes (B) comprise glass platelets, wherein the glass is borosilicate glass. In an very preferred embodiment, pigment flakes (B) comprise $Al_2O_3$ platelets.

In an embodiment, pigment flakes (B) or (C) are coated with one or more layers of metal oxide, such as with at least one layer of metal oxide chosen from the group consisting of $TiO_2$, $ZrO_2$, $SnO_2$, ZnO, $MnO_2$, MgO, $Ce_2O_3$, $Fe_2O_3$, $Fe_3O_4$, $FeTiO_5$, $Cr_2O_3$, CoO, $CO_3O_4$, $VO_2$, $V_2O_3$, NiO and combinations thereof. In preferred embodiments, pigment flakes (B) or (C) are coated with one or more layers of metal oxide chosen from the group consisting of $TiO_2$, $Fe_2O_3$, $Fe_3O_4$, $SnO_2$, $ZrO_2$, $Cr_2O_3$ and combinations thereof, such as coated with one layer of metal oxide chosen from the group consisting of $TiO_2$, $Fe_2O_3$ and a combination thereof.

Examples of pigment flakes (B) comprising $Al_2O_3$ platelets coated with different layers of metal oxide, $SiO_2$ and an organic dye as a top coat are disclosed in EP2799398B1, which is incorporated herein by reference in its entirety.

Examples of pigment flakes (B) comprising $Al_2O_3$ platelets coated with metal oxide chosen from the group consisting of $TiO_2$, $Fe_2O_3$ and a combination thereof, and their preparation are disclosed in U.S. Pat. No. 6,267,810B1, which is incorporated herein by reference in its entirety.

Examples of pigment flakes (B) comprising $Al_2O_3$ platelets coated with a $TiO_2$ layer or a $Fe_2O_3$ layer are Xirallic® pigments (Merck, Germany). Xirallic® pigments typically have a median diameter (D50) of between 5 and 50 μm and a thickness of up to 1 μm.

In another embodiment, pigment flakes (B) or (C) are coated with a layer of titanium suboxides ($Ti_nO_{2n-1}$, with n being an integer greater than 1, such as the oxides $Ti_3O_5$, $Ti_2O_3$), with a layer of titanium oxynitrides, with a layer of FeO(OH), or with a thin semitransparent metal layer, for example comprising Al, Fe, Cr, Ag, Au, Pt or Pd, or combinations thereof.

In yet another embodiment, pigment flakes (B) or (C) are coated with a layer of a metal sulfide, such as coated with sulfides of tungsten, molybdenum, cerium, lanthanum or rare earth elements.

In another embodiment, pigment flakes (B) or (C) are coated with an outer layer of one or more colorants, for example Prussian Blue or Carmine Red, and a binder for fixation of the colorant.

As will be appreciated by those skilled in the art, these different layers can be combined, provided that the layer of one or more colorants and a binder is, if present, always an outer layer.

Examples of pigment flakes (C) comprising platelets of $Al_2O_3$ doped with titanium oxide and coated with metal oxide and their manufacture are disclosed in EP0763573B1, which is incorporated herein by reference in its entirety.

Examples of pigment flakes (C) comprising platelets of $Al_2O_3$ doped $TiO_2$, $ZrO_2$, $SiO_2$, $SnO_2$, $In_2O_3$ or ZnO and coated with metal oxide are disclosed in EP2799398B1, which is incorporated herein by reference in its entirety.

Ratio Diameter Pigment Flakes to Diameter Spherical Glass Beads

In a preferred embodiment, the median diameter D50 of the pigment flakes is greater than 36% of the median particle diameter D50 of the spherical glass beads, more preferably greater than 38%, such as greater than 40, greater than 45, greater than 50%, greater than 55%, greater than 60%, greater than 70%, greater than 90%, greater than 110% or greater than 130%.

In another preferred embodiment, the median diameter D50 of the pigment flakes is between 35 and 400% of the median particle diameter D50 of the spherical glass beads, more preferably between 40 and 400%, such as between 45 and 400%, between 50 and 400%, between 55 and 400%, between 60 and 400%, between 70 and 400%, between 90 and 400%, between 110 and 400% or between 130 and 400%.

In yet another embodiment, the median diameter D50 of the pigment flakes is between 35 and 350% of the median particle diameter D50 of the spherical glass beads, more preferably between 35 and 300%, such as between 35 and 250%, between 35 and 225%, between 35 and 200%, between 35 and 175%, between 35 and 150%, between 35 and 125%, between 35 and 100% or between 35 and 75%.

Amount of Pigment Flakes

In a preferred embodiment, the amount of said pigment flakes in the basecoat layer (a) is 0.1-25 wt. %, based on the weight of the basecoat layer (a), such as 0.5-20 wt. %, 1-18 wt. %, 2-16 wt. %, 3-14 wt. % or 5-13 wt. %.

In an embodiment, the amount of said pigment flakes in the basecoat layer (a) is 0.1-24 wt. %, based on the weight of the basecoat layer (a), such as 0.1-20 wt. %, 0.1-18 wt. %, 0.1-16 wt. %, 0.1-14 wt. % or 0.1-13 wt. %.

In another embodiment, the amount of said pigment flakes in the basecoat layer (a) is 0.5-30 wt. %, based on the weight of the basecoat layer (a), such as 1-30 wt. %, 2-30 wt. %, 5-30 wt. %, 8-30 wt. % or 10-30 wt. %.

The amount of said pigment flakes in the basecoat layer (a) is preferably 1 part by weight to between 1 and 30 part by weight of the spherical glass beads, preferably 1 part by weight to between 1 and 15 part by weight of the spherical glass beads, more preferably 1 part by weight to between 1 and 10 part by weight of the spherical glass beads.

Further Ingredients

As defined hereinbefore, the basecoat layer (a) comprises 0-30 wt. % of further ingredients. As will be appreciated by the skilled person, the 'further' ingredients are different from the other ingredients defined in the basecoat layer (a). In other words, the further ingredients do not comprise said binder, said spherical glass beads and said pigment flakes.

In an embodiment, the further ingredients are chosen from the group consisting of thickeners, foam control agents, luminescent agents, UV-absorbers, preservatives, dyes, curing initiators, organic pigments, inorganic pigments other than the metallic pigment flakes and pearlescent pigment flakes, and combinations thereof.

In embodiments, the amount of the further ingredients is 0.01-25 wt. %, 0.02-20 wt. %, 0.05-18 wt. %, 0.1-16 wt. %, 0.2-14 wt. %, 0.25-12 wt. %, 0.30-10 wt. %, or 0.35-8 wt. %, based on the weight of basecoat layer (a).

In embodiments, the amount of the further ingredients is 0-25 wt. %, 0-20 wt. %, 0-18 wt. %, 0-16 wt. %, 0-14 wt. %, 0-12 wt. %, 0-10 wt. %, or 0-8 wt. %, based on the weight of basecoat layer (a).

In other embodiments, the amount of the further ingredients is 0.01-30 wt. %, 0.02-30 wt. %, 0.05-30 wt. %, 0.1-30 wt. %, 0.2-30 wt. %, 0.25-30 wt. %, 0.30-30 wt. %, or 0.35-30 wt. %, based on the weight of basecoat layer (a).

The basecoat layer (a) typically comprises one or more thickeners as part of the further ingredients. A thickener can provide the composition to be applied to the vehicle, for example a water-based or organic-solvent-based composition, with the required rheology to produce a high quality basecoat layer (a). Without wishing to be bound by any theory, it is believed that the thickener has no specific advantageous properties in the dried, cured or ready-to-use coating on the vehicle.

In an embodiment, the further ingredients comprise a thickener and the amount of the thickener is 0.01-3 wt. %, more preferably 0.01-2 wt. %, even more preferably 0.01-1 wt. %, based on the weight of the basecoat layer (a).

As will be appreciated by those skilled in the art, the type of thickener that is present in the basecoat (a) depends on the way the 'precursor basecoat layer (a) composition' is applied to the vehicle. Precursor compositions that are applied in water-based or aqueous form on the one hand and compositions that are applied based on organic solvents on the other hand typically require different thickeners to obtain the required rheological properties.

Thickeners for Water-Based or Aqueous Compositions

One preferred group of thickeners for aqueous precursor basecoat layer (a) compositions are ASE polymers (Alkali Swellable Emulsion; these polymers are produced using emulsion polymerization). In an embodiment, the hydrophilic monomers of the ASE polymer are chosen from the group consisting of (meth)acrylic acid, maleic acid and combinations thereof. In another embodiment, the hydrophobic monomers of the ASE polymer are chosen from the group consisting of the esters of (meth)acrylic acid with $C_1$- to $C_4$-alcohols, in particular of ethyl acrylate, butyl acrylate, and methyl methacrylate.

Another preferred group of thickeners for aqueous precursor basecoat layer (a) compositions are HASE polymers (Hydrophobically-modified Alkali Swellable Emulsion, these polymers are produced using emulsion polymerization). The hydrophilic and hydrophobic monomers of the HASE polymers can be the same as described with respect to the ASE polymers. Preferred hydrophobic associative monomers are (meth)acrylic ester monomers of (meth) acrylic acid and $C_8$-$C_{22}$-alcohols and/or vinyl ester monomers of (substituted) vinyl alcohols and $C_8$-$C_{22}$-alkyl acids.

Yet another preferred group of thickeners for aqueous precursor basecoat layer (a) compositions are Hydrophobically-modified Ethoxylated URethane (HEUR) polymers. Unlike ASE or HASE-type thickeners, HEUR polymers are non-ionic and soluble at any pH. This solubility is due to the polymer's ethylene oxide backbone, which is water soluble and makes up the majority of the polymer structure. Thus, HEUR polymers require a hydrophobic moiety in the composition to interact with the ethylene oxide backbone to impart structure.

Examples of ASE polymers include Rheovis® 1125 (available from BASF Corporation), ACULYN™ 33; ACULYN™ 38, ACUSOL™ 810A, ACUSOL™ 830, ACUSOL™ 835, ACUSOL™ 842 (all available from DOW Chemical), and Carbopol® Aqua 30 polymer (from Lubrizol Corporation).

Examples of HASE polymers include ACULYN™ Excel, ACRYSOL™ TT615, ACULYN™ 22; ACULYN™ 88, ACUSOL™ 801S, ACUSOL™ 805S, ACUSOL™ 820 and ACUSOL™ 823 (all available from DOW Chemical).

Examples of HEUR polymers include ACUSOL™ 880, ACUSOL™ 882, ACULYN™ 44 and ACULYN™ 46N (all available from DOW Chemical).

In yet another embodiment, the thickeners for aqueous precursor basecoat layer (a) compositions are chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea or urea-modified polyamides, and combinations thereof.

Thickeners for Organic-Solvent-Based Compositions

Examples of thickeners that can be used in precursor basecoat layer (a) compositions based on organic solvents are preferably chosen from the group consisting of (modified) hydrogenated castor oil, clay, modified clay, calcium sulphonate complex, organophilic phyllosilicate, silica-gel, synthetic amorphous silica, acrylic acid type gellants, modified cellulosic materials, polyurea dispersions, solutions of urea-modified polyamides, polyurethane dispersions and combinations thereof. Examples of modified clay includes BENTONE® LT and BENTONE® 38 (Elementis Global). An example of a silica-gel includes HDK® N20 (Wacker Chemical Corporation), or AEROSIL® (Evonik). An example of organophilic phyllosilicate includes Claytone 40 (Byk). An example of a modified hydrogenated castor oil is Efka® RM 1900 (BASF). An example of a hydrogenated castor oil is Efka® RM 1920 (BASF). An example of a solution of a urea-modified non-polar polyamide in isobutanol/monophenyl glycol is Rheobyk-431 (Byk). An example of a solution of a urea-modified polyamide of medium polarity in isobutanol/solvent naphtha is Rheobyk-430 (Byk). An example of synthetic amorphous silica is Zeothix® (Huber).

In a preferred embodiment, precursor basecoat layer (a) compositions based on organic solvents comprise two thickeners, more preferably:

- an organophilic phyllosilicate and a modified hydrogenated castor oil; or
- a calcium sulphonate complex and a polyurea dispersion.

Preferred Thickeners in Basecoat Layer (a)

In a preferred embodiment, the basecoat layer (a) comprises one or more thickeners as part of the further ingredients chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea or urea-modified polyamides, (modified) hydrogenated castor oil, clay, modified clay, calcium sulphonate complex, organophilic phyllosilicate, silica-gel, synthetic amorphous silica, acrylic acid type gellants, modified cellulosic materials, polyurea dispersions, solutions of urea-modified polyamides, polyurethane dispersions and combinations thereof.

Laser Imaging Detection and Ranging (LIDAR) Process

A second aspect of the invention concerns a Laser Imaging Detection And Ranging (LIDAR) process of the vehicle as defined hereinbefore, said process comprising the steps of:

(i) providing a LIDAR device comprising a source of electromagnetic radiation, a receiver and optionally a Global Positioning System (GPS);

(ii) transmitting electromagnetic radiation from the source of electromagnetic radiation of the LIDAR device to the vehicle;

(iii) scanning the electromagnetic radiation reflected by the coating of the vehicle by the receiver of the LIDAR device; and (iv) computing from the differences between the transmitted electromagnetic radiation and the scanned reflected electromagnetic radiation, preferably as a function of time, one or more of:

the distance between the vehicle and the LIDAR device;

the acceleration of the vehicle;

the deceleration of the vehicle;

the direction of movement of the vehicle;

the speed of the vehicle, preferably the speed of the vehicle relative to that of the LIDAR device; and a 3D image of the vehicle.

As will be appreciated by those skilled in the art, computing the speed, acceleration, deceleration and direction of movement of the vehicle requires that steps (ii) and (iii) are performed as a function of time.

If the LIDAR device is also equipped with a GPS, the distance between the vehicle and the LIDAR device can also be indicated on a map and the 3D image of the vehicle can be identified on a map.

In a preferred embodiment, the electromagnetic radiation transmitted and scanned in steps (ii) and (iii), respectively, has a wavelength between 740 nm and 2500 nm, preferably a wavelength between 750 nm and 1800 nm, more preferably a wavelength between 780 nm and 1600 nm, such as 905 nm or 1550 nm.

In an embodiment, the electromagnetic radiation transmitted and scanned in steps (ii) and (iii), respectively, has a wavelength between 740 nm and 2200 nm, such as between 740 nm and 2000 nm, between 740 nm and 1800 nm, between 740 nm and 1700 nm, between 740 nm and 1650 nm and between 740 nm and 1600 nm.

In another embodiment, the electromagnetic radiation transmitted and scanned in steps (ii) and (iii), respectively, has a wavelength between 750 nm and 2500 nm, such as between 780 nm and 2500 nm, between 800 nm and 2500 nm, between 825 nm and 2500 nm, between 850 nm and 2500 nm and between 875 nm and 2500 nm.

The LIDAR device can for example be a mobile device, such as a LIDAR gun for checking the speed of vehicles, a device fixed on certain infrastructural elements, for example to determine traffic density, or a mobile device positioned in another vehicle.

Radio Detection and Ranging (RADAR) Process

Another aspect of the invention concerns a Radio Detection And Ranging (RADAR) process comprising the steps of:

(i) providing a vehicle as defined hereinbefore with a RADAR device within the frame or coachwork, said RADAR device comprising a source of radio waves and a receiver, and wherein the vehicle optionally comprises a Global Positioning System (GPS);

(ii) transmitting radio waves from the source of radio waves of the RADAR device through the at least part of the outer surface of the frame or coachwork of the vehicle that is covered with the coating as defined hereinbefore to an object outside of the vehicle;

(iii) scanning the radio waves reflected by the object outside of the vehicle by the receiver of the RADAR device; and (iv) computing from the differences between the transmitted radio waves and the scanned reflected radio waves, preferably as a function of time, one or more of:

the distance between the object and the RADAR device;

the acceleration of the object with respect to the RADAR device;

the deceleration of the object with respect to the RADAR device;

the direction of movement of the object with respect to the RADAR device; and the speed of the object, preferably the speed of the object relative to that of the RADAR device.

The wording ‘a RADAR device within the frame or coachwork’ as used herein implies that the frame or coachwork is positioned between the RADAR device and the object outside of the vehicle, such as a RADAR device positioned inside the vehicle behind the bumper to scan objects outside the vehicle in front of the bumper.

In this RADAR process, the part of the outer surface of the frame or coachwork to which the coating is applied preferably is a plastic part, such as a plastic bumper. In a preferred embodiment of this RADAR process, the part of the outer surface of the frame or coachwork to which the coating is applied is a plastic part, such as a plastic bumper, and the pigment flakes are chosen from the group consisting of metallic pigment flakes. The RADAR device comprising the source of radio waves and the receiver is preferably positioned within the frame or coachwork of the vehicle behind the plastic bumper.

In this RADAR process, the part of the outer surface of the frame or coachwork to which the coating is applied preferably is the outer surface of a plastic part, such as the outer surface of a plastic bumper. In a preferred embodiment of this RADAR process, the part of the outer surface of the frame or coachwork to which the coating is applied is the outer surface of a plastic part, such as the outer surface of a plastic bumper, and the pigment flakes are chosen from the group consisting of metallic pigment flakes. The RADAR device comprising the source of radio waves and the receiver is preferably positioned within the frame or coachwork of the vehicle behind the plastic bumper.

As will be appreciated by those skilled in the art, computing the speed, acceleration, deceleration and direction of movement of the object requires that steps (ii) and (iii) are performed as a function of time.

The distance between the object and the RADAR device can be processed to a (real time) image of the surroundings of the vehicle to be shown on video screen inside the vehicle.

If the vehicle is also provided with a GPS, the distance between the object and the RADAR device can also be indicated on a map.

In a preferred embodiment, the radio waves transmitted and scanned in steps (ii) and (iii), respectively, have a wavelength between 3.5 mm and 14.5 mm. In another preferred embodiment, the radio waves transmitted and scanned in steps (ii) and (iii), respectively, have a wavelength between 12.1 mm and 12.6 mm (Short-Range RADAR; SRR). In yet another preferred embodiment, the radio waves transmitted and scanned in steps (ii) and (iii), respectively, have a wavelength between 3.6 mm and 4.0 mm (Long-Range RADAR; LRR).

Process for Coating the Outer Surface of the Frame or Coachwork of a Vehicle

The basecoat layer (a) is typically provided to the outer surface of the frame or coachwork of the vehicle in the form of an organic-solvent-based composition or in the form of an aqueous or water-based composition. Such a composition is called a ‘precursor basecoat layer (a) composition’ in what follows.

These organic-solvent-based, aqueous or water-based precursor basecoat layer (a) compositions thus comprise, in addition to the solid ingredients of the basecoat layer (a) in the relative amounts as defined hereinbefore, a solvent. The amount of solvent in the organic-solvent-based, aqueous or water-based compositions is typically 15-75 wt. %, based on the weight of the precursor basecoat layer (a) composition, such as 25-65 wt. %.

In other words, a precursor basecoat layer (a) composition may consist of, based on the weight of precursor basecoat layer (a) composition:

(A) 15-75 wt. % of water, aqueous solvent or organic solvent; and (B) 25-85 wt. % of a solids composition, wherein the solids composition (B) consists of, based on the weight of the solids composition (B):

14.95-98.95 wt. % of binder;

1-85 wt. % of spherical glass beads having a median particle diameter D50, as measured with laser diffraction, between 1 and 150 μm, and having a refractive index, measured at a wavelength λ of 589 nm, between 1.7 and 2.8;

0.05-30 wt. % of pigment flakes chosen from the group consisting of metallic pigment flakes, pearlescent pigment flakes or a combination thereof, said pigment flakes having a median diameter D50, as measured with laser diffraction, between 1 and 75 μm, a thickness smaller than 1 μm and an aspect ratio (flake diameter/thickness) of at least 10; and 0-30 wt. % of further ingredients, wherein the median diameter D50 of said pigment flakes is greater than 35% of the median particle diameter D50 of said spherical glass beads.

The solvent can for example be an aqueous solvent or water. The term 'aqueous solvent' as used herein concerns a solvent that comprises at least 70 wt. % of water, based on the weight of the aqueous solvent, preferably at least 80 wt. % of water, more preferably at least 90 wt. % of water, even more preferably at least 95 wt. % of water, such as at least 96 wt. %, at least 97 wt. % or at least 98 wt. % The remaining solvents in the aqueous solvent are not particularly limited, but are typically water-miscible organic solvents, such as an alcohol (for example, methanol, ethanol, propanol, isopropanol, butanol, isobutanol, sec-butanol, t-butanol, pentanol, hexanol, cyclohexanol), a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, or thiodiglycol), a glycol derivative such as, e.g., an ether or an ester (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether), an amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine), an amide (for example, formamide, N,N-dimethylformamide, or N,N-dimethylacetamide), dimethylsulfoxide, sulfolane, 2-pyrrolidone, N-methyl-2-pyrrolidone, N-vinyl-2-pyrrolidone, 2-oxazolidone, 1,3-dimethyl-2-imidizolidinone, acetonitrile, acetone and combinations thereof.

The organic solvent can be a mixture of organic solvents. Preferred organic solvents are chosen from the group consisting of aliphatic and aromatic solvents, ketones, esters, glycoethers, alcohols, halogenated hydrocarbons, and combinations thereof. Very preferred organic solvent are chosen from the group consisting of xylene (mixture of isomers), toluene, ethylbenzene, naphtha, 1,2,4-trimethylbenzene, mesitylene, n-propylbenzene, isopentyl acetate, n-butyl acetate, (2-methoxymethylethoxy) propanol, 2-butoxyethyl acetate, 2-methylbutyl acetate, isobutanol, 1-butanol, 1-ethoxypropane-2-ol, 2,6-dimethyl-4-heptanone, 2-methoxy-1-methylethylacetate, 4,6-dimethyl-heptane-2-one, 4-methyl-2-pentanone, 1-methoxy-2-propanol, 1-methoxy-2-propylacetate, 2-(2-butoxyethoxy) ethanol, 2-butoxyethanol, 5-methylhexane-2-one, ethyl acetate and combinations thereof.

Alternatively, the 'precursor basecoat layer (a) composition' can also be a reactive system wherein the solvent comprises liquid reactive organic monomers, such as low-molecular-weight acrylates, and wherein the binder comprises reactive higher molecular weight organic resins, that may be dispersed or dissolved in the solvent. Accordingly, solvent and resin may both constitute the liquid phase in the precursor basecoat layer (a) composition and may together form the binder in the basecoat layer (a) upon curing.

In an aspect, the invention concerns a process for coating at least part of the outer surface of the frame or coachwork of a vehicle, said process comprising the steps of:

i) providing a vehicle with a frame or coachwork, said frame or coachwork having an outer surface, wherein at least part of said outer surface may already contain different coating layers;

ii) applying a precursor basecoat layer (a) composition as defined hereinbefore onto at least part of the outer surface of the frame or coachwork of step (i) or onto the outer coating layer of the different coating layers of step (i) to provide a precursor basecoat layer (a);

iii) optionally at least partially drying and curing the precursor basecoat layer (a) of step (ii) to provide basecoat layer (a);

iv) optionally applying a precursor tinted clearcoat layer (b) composition onto at least part of the precursor basecoat layer (a) of step (ii) or onto at least part of the basecoat layer (a) of step (iii) to provide a precursor tinted clearcoat layer (b), optionally followed by at least partially drying and curing to provide tinted clearcoat layer (b);

v) applying a precursor clearcoat layer (c) composition onto at least part of the precursor basecoat layer (a) of step (ii), onto at least part of the basecoat layer (a) of step (iii), onto the precursor tinted clearcoat layer (b) of step (iv) or onto the tinted clearcoat layer (b) of step (iv), followed by drying and curing to provide clearcoat top layer (c).

Step (ii) of applying the precursor basecoat layer (a) composition can comprise applying a single layer in one step or multiple layers on top of each other in subsequent steps. Subsequent layers can be applied 'wet on wet', meaning that a subsequent layer is applied onto the previous layer from which at least some to practically all solvent is evaporated but which is not (fully) cured. This means that, even when subsequent layers are applied 'wet on wet', an intermediate drying step is applied between applying the subsequent layers.

It is also possible to completely dry and cure a previous layer before applying a subsequent layer. It is within the skills of the artisan to choose the appropriate drying conditions.

In an embodiment, step (ii) encompasses applying more than one layer, such as 2, 3, 4 or 5 layers.

In an embodiment, step (ii) encompasses n subsequent steps resulting in n layers, and wherein layer x is at least partially applied onto layer x−1, wherein x is an integer between 2 and n, and wherein n is an integer between 2 and 5.

Steps (iv) and (v) of applying the precursor (tinted) clearcoat composition can comprise applying a single layer in one step or multiple layers on top of each other in subsequent steps. Subsequent layers can be applied 'wet on wet', meaning that a subsequent layer is applied onto the previous layer which is not (fully) dried or cured.

In an embodiment, the precursor clearcoat layer (c) composition applied in step (v) is applied on a layer that is not fully dried or cured, i.e. applied 'wet on wet'. It is within the skills of the artisan to choose the appropriate drying conditions.

The geometry of the outer surface of the frame or coachwork to be coated is not limited in any sense as long as it can be coated, for example by spraying. In embodiments, the outer surface of the frame or coachwork to be coated is planar. In other embodiments the outer surface of the frame or coachwork to be coated is curved. In further embodiments, the outer surface of the frame or coachwork to be coated comprises planar parts and curved parts.

Step (ii) of applying the precursor basecoat layer (a) composition is preferably performed using powder coating, electrostatic atomization, curtain coating, a spray gun, a high-speed rotary bell, a high-speed rotating disc or using a spray can with a propellant. In a preferred embodiment, spraying is performed without using a propellant.

In another preferred embodiment, the outer two or three coating layers as defined hereinbefore are applied to a sticker, which is subsequently applied onto at least part of the outer surface of the frame or coachwork or, if present, onto at least part of the outer coating layer of the different coating layers already present on the vehicle.

Uses

In a third aspect, the invention concerns the use of the vehicle as defined herein or a coated substrate, wherein the coating comprises at least two layers of which the outer two or three layers are:

(a) a basecoat layer;

(b) optionally a tinted clearcoat layer on (a);

(c) a clearcoat top layer on (a) or on (b);

wherein the basecoat layer (a) consists of, based on the weight of said basecoat layer (a):

14.95-98.95 wt. % of binder;

1-85 wt. % of spherical glass beads having a median particle diameter D50, as measured with laser diffraction, between 1 and 150 μm, and having a refractive index, measured at a wavelength λ of 589 nm, between 1.7 and 2.8;

0.05-30 wt. % of pigment flakes chosen from the group consisting of metallic pigment flakes, pearlescent pigment flakes or a combination thereof, said pigment flakes having a median diameter D50 between 1 and 75 μm, as measured with laser diffraction, a thickness smaller than 1 μm and an aspect ratio (flake diameter/thickness) of at least 10; and 0-30 wt. % of further ingredients, wherein the median diameter D50 of said pigment flakes is greater than 35% of the median particle diameter D50 of said spherical glass beads, in Laser Imaging Detection And Ranging (LIDAR) of said vehicle or of said coated substrate; and/or to improve the visibility of said vehicle or of said coated substrate under visible light conditions; and/or to prepare a 3-dimensional image of said vehicle or of said coated substrate.

In another aspect, the invention concerns the use of spherical glass beads having a median particle diameter D50, as measured with laser diffraction, between 1 and 150 μm, and having a refractive index, measured at a wavelength λ of 589 nm, between 1.7 and 2.8, as a transparency improver for radio waves in a coating layer comprising binder and metallic pigment flakes, said metallic pigment flakes having a median diameter D50, as measured with laser diffraction, between 2 and 75 μm, a thickness smaller than 1 μm and an aspect ratio (flake diameter/thickness) of at least 10, wherein the median diameter D50 of said metallic pigment flakes is greater than 35% of the median particle diameter D50 of said spherical glass beads.

Preferred embodiments defined in the context of the first, second and third aspect also apply to this further aspect.

FURTHER EMBODIMENTS

In a fourth aspect, the invention concerns a vehicle having a frame or coachwork, wherein at least part of the outer surface of the frame or coachwork is covered with a coating, said coating comprising at least two layers, or coated substrate, wherein the coating comprising at least two layers, wherein the outer two or three layers are:

(a) a basecoat layer;

(b) optionally a tinted clearcoat layer on (a);

(c) a clearcoat top layer on (a) or on (b);

wherein the basecoat layer (a) consists of, based on the weight of said basecoat layer (a):

14.95-98.95 wt. % of binder;

1-85 wt. % of spherical glass beads having a median particle diameter D50, as measured with laser diffraction, between 1 and less than 10 μm, and having a refractive index, measured at a wavelength λ of 589 nm, between 1.7 and 2.8;

0.05-30 wt. % of pigment flakes chosen from the group consisting of metallic pigment flakes, pearlescent pigment flakes or a combination thereof, said pigment flakes having a median diameter D50, as measured with laser diffraction, between 1 and 75 μm, a thickness smaller than 1 μm and an aspect ratio (flake diameter/thickness) of at least 10; and 0-30 wt. % of further ingredients.

In a fifth aspect, the invention concerns a Laser Imaging Detection And Ranging (LIDAR) process of the vehicle as defined in the fourth aspect, said process comprising the steps of:

(i) providing a LIDAR device comprising a source of electromagnetic radiation, a receiver and optionally a Global Positioning System (GPS);

(ii) transmitting electromagnetic radiation from the source of electromagnetic radiation of the LIDAR device to the vehicle;

(iii) scanning the electromagnetic radiation reflected by the coating of the vehicle by the receiver of the LIDAR device; and (iv) computing from the differences between the transmitted electromagnetic radiation and the scanned reflected electromagnetic radiation, preferably as a function of time, one or more of:

the distance between the vehicle and the LIDAR device;

the acceleration of the vehicle;

the deceleration of the vehicle;

the direction of movement of the vehicle;

the speed of the vehicle, preferably the speed of the vehicle relative to that of the LIDAR device; and a 3D image of the vehicle.

Another aspect of the invention concerns a Radio Detection And Ranging (RADAR) process comprising the steps of:

(i) providing a vehicle as defined in the fourth aspect with a RADAR device within the frame or coachwork, said RADAR device comprising a source of radio waves and a receiver, and wherein the vehicle optionally comprises a Global Positioning System (GPS);

(ii) transmitting radio waves from the source of radio waves of the RADAR device through the at least part of the outer surface of the frame or coachwork of the vehicle that is covered with the coating as defined in the fourth aspect to an object outside of the vehicle;

(iii) scanning the radio waves reflected by the object outside of the vehicle by the receiver of the RADAR device; and (iv) computing from the differences between the transmitted radio waves and the scanned reflected radio waves, preferably as a function of time, one or more of:

the distance between the object and the RADAR device;

the acceleration of the object with respect to the RADAR device;

the deceleration of the object with respect to the RADAR device;

the direction of movement of the object with respect to the RADAR device; and the speed of the object, preferably the speed of the object relative to that of the RADAR device.

In a sixth aspect, the invention concerns the use of the vehicle or the coated substrate, as defined in the fourth aspect:

in Laser Imaging Detection And Ranging (LIDAR) of said vehicle or of said coated substrate; and/or to improve the visibility of said vehicle or of said coated substrate under visible light conditions; and/or to prepare a 3-dimensional image of said vehicle or of said coated substrate.

In another aspect, the invention concerns the use of spherical glass beads having a median particle diameter D50, as measured with laser diffraction, between 1 and 150 µm, and having a refractive index, measured at a wavelength λ of 589 nm, between 1.7 and 2.8, as a transparency improver for radio waves in a coating layer comprising binder and metallic pigment flakes, said metallic pigment flakes having a median diameter D50, as measured with laser diffraction, between 2 and 75 µm, a thickness smaller than 1 µm and an aspect ratio (flake diameter/thickness) of at least 10.

Preferred embodiments defined in the context of the first, second and third aspect also apply to the fourth, fifth and sixth aspect.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one'.

EXAMPLES

Materials

Spherical Glass Beads

Micro glass beads (AL), obtained from Jianxi Sunflex Light Retroreflective Material Co, Ltd., China, having a refractive index of about 2.2, measured at a wavelength λ of 589 nm, having a median particle diameter D50 of 40.4 µm, a D10 diameter of 37.3 µm and a D90 diameter of 44.1 µm, as measured with laser diffraction Micro glass beads (AS), obtained from Jianxi Sunflex Light Retroreflective Material Co, Ltd., China, having a refractive index of about 2.2, measured at a wavelength λ of 589 nm, having a median particle diameter D50 of 20 µm, a D10 diameter of 16.3 µm and a D90 diameter of 26.2 µm, as measured with laser diffraction.

Micro glass beads (BS), obtained from Swarco, Austria, having a refractive index of about 2.1, measured at a wavelength λ of 589 nm, having a median particle diameter D50 of about 5 µm, and a D90 diameter of 10 µm, as measured with laser diffraction.

Micro glass beads (CL), obtained from Jianxi Sunflex Light Retroreflective Material Co, Ltd., China, having a refractive index of about 1.9, measured at a wavelength λ of 589 nm, having a median particle diameter D50 of 40.4 µm, a D10 diameter of 34.9 µm and a D90 diameter of 44 µm, as measured with laser diffraction.

Micro glass beads (CS), obtained from Jianxi Sunflex Light Retroreflective Material Co, Ltd., China, having a refractive index of about 1.9, measured at a wavelength λ of 589 nm, having a median particle diameter D50 of 20 µm, a D10 diameter of 14.7 µm and a D90 diameter of 25.1 µm, as measured with laser diffraction.

Solvents.

Demi water

Solvent part of Syrox S900 binder, Syrox S941 thinner, ACULYN™ Excel, AMP-Ultra PC 2000 and Acticide® MBL Further Ingredients.

Solids part of AMP-Ultra® PC 2000, obtained from Angus Chemical Company; neutralizer Solids part of Acticide® MBL, obtained from Thor; preservative Solids part of ACULYN™ Excel, obtained from DOW Chemical, HASE thickener Binder Solids part of Syrox S900 binder and Syrox S941 thinner, obtained from Axalta Coating Systems Pigment Flakes Xirallic® T60-10 SW Crystal Silver, obtained from Merck KGaA, coated $Al_2O_3$ flakes, having a median diameter (D50) of about 18 µm, a thickness smaller than 1 μm and an aspect ratio (flake diameter/thickness) of more than 10 ($Al_2O_3$, $TiO_2$, $SnO_2$)

Xirallic® T61-10 WNT Crystal Silver, obtained from Merck KGaA, coated $Al_2O_3$ flakes, having a median diameter (D50) of about 11 μm, a thickness smaller than 1 μm and an aspect ratio (flake diameter/thickness) of more than 10 ($Al_2O_3$, $TiO_2$, $SnO_2$)

Iriodin® 9602 Silver-Grey SW, obtained from Merck Performance Materials Germany GmbH, having a median diameter (D50) of 22.3 μm, a thickness smaller than 1 μm and an aspect ratio (flake diameter/thickness) of more than 10 (Mica, $TiO_2$, $Fe_2O_3$ and $SnO_2$)

Iriodin® 9612 Silver-Grey Fine Satin SW, obtained from Merck Performance Materials Germany GmbH, having a median diameter (D50) of 7.2 μm, a thickness smaller than 1 μm and an aspect ratio (flake diameter/thickness) of more than 10 (Mica, $TiO_2$, $Fe_2O_3$ and $SnO_2$)

Clearcoat Composition

S5000 HS Top Clear/S6000 HS Activator Slow, clearcoat precursor composition, obtained from Axalta Coating Systems Compositions Twelve aqueous precursor basecoat layer (a) compositions with different types of spherical glass beads and different types of pigment flakes were prepared as follows.

In a first step, for each type of spherical glass beads, an 'intermediate composition' was prepared by adding the following ingredients (see section 'Materials') at ambient temperature (~20° C.) to a container in the following order: (1) demi water, (2) preservative Acticide® MBL, (3) spherical glass beads, (4) AMP-Ultra® PC 2000 neutralizer to adjust the pH, and (5) ACULYN™ Excel thickener. The resulting mixtures were stirred in a Dispermill Orange-line 18/186 during about 5 minutes, at ambient temperature.

The twelve aqueous precursor basecoat layer (a) compositions were prepared by putting Syrox S900 binder, Syrox S941 thinner, different types of pigment flakes (see section 'Materials') and an intermediate composition described supra in a beaker, followed by thorough mixing with a Dispermill Orange-line 18/186 during 5-10 minutes at ambient temperature (~20° C.). The types and the amounts (wt. %, based on the weight of the aqueous precursor basecoat layer (a) compositions) of the ingredients in the different aqueous precursor basecoat layer (a) compositions is shown in Tables 1 and 2. Tables 1 and 2 also list the ratio [%] of the median diameter D50 of the pigment flakes to the median particle diameter D50 of the spherical glass beads in the different aqueous precursor basecoat layer (a) compositions.

TABLE 1

| aqueous precursor basecoat layer (a) compositions | | |
|---|---|---|
| Sample | # 4 | # 9 |
| Ratio [%] | 55 | 18 |
| Binder [wt. %] | | |
| Syrox S900 (#) | 10.46 | 10.55 |
| Syrox S941 (#) | 2.60 | 2.50 |
| Subtotal binder | 13.06 | 13.05 |
| Spherical glass beads [wt. %] | | |
| Glass Beads AL − $D_{50}$ = 40.4 μm | 12.34 | 12.43 |
| Subtotal spherical glass beads | 12.34 | 12.43 |
| Solvents [wt. %] | | |
| Water | 6.91 | 6.96 |
| Syrox S900 (*) | 48.65 | 49.08 |
| Syrox S941 (*) | 15.71 | 15.17 |
| Further solvents (§) | 0.26 | 0.25 |
| Subtotal solvents | 71.53 | 71.46 |
| Pigment flakes [wt. %] | | |
| Iriodin ® Grey 22.3 μm | 2.97 | |
| Iriodin ® Grey Fine Satin 7.2 μm | | 2.96 |
| Subtotal pigments flakes | 2.97 | 2.96 |
| Further ingredients [wt. %] | | |
| Acticide ® MBL (#) | 0.02 | 0.02 |
| AMP-Ultra ® PC 2000 (#) | <0.01 | <0.01 |
| ACULYN ™ Excel (#) | 0.08 | 0.08 |
| Subtotal further ingredients | 0.10 | 0.10 |
| Total composition | 100.00 | 100.00 |

(*) Solvent part of this ingredient (#) Solids parts of this ingredient (§) Solvent part of Acticide ® MBL, AMP-Ultra ® PC 2000 and ACULYN ™ Excel

TABLE 2

| aqueous precursor basecoat layer (a) compositions | | | | | | | | | | |
|---|---|---|---|---|---|---|---|---|---|---|
| Sample | #11 | #12 | #13 | #14 | #15 | #16 | #17 | #18 | #19 | #20 |
| Ratio [%] | 90 | 45 | 90 | 45 | 360 | 55 | 27 | 55 | 27 | 220 |
| Binder [wt. % ] | | | | | | | | | | |
| Syrox S900 (#) | 10.54 | 10.58 | 10.52 | 10.59 | 12.34 | 10.62 | 10.58 | 10.53 | 10.62 | 12.30 |
| Syrox S941 (#) | 2.50 | 2.47 | 2.42 | 2.46 | 2.45 | 2.43 | 2.47 | 2.50 | 2.42 | 2.50 |
| Subtotal binder | 13.04 | 13.05 | 12.94 | 13.05 | 14.79 | 13.05 | 13.05 | 13.03 | 13.04 | 14.80 |
| Spherical glass beads [wt. %] | | | | | | | | | | |
| CS $D_{50}$ = 20 μm | 12.48 | | | | | 12.54 | | | | |
| CL $D_{50}$ = 40.4 μm | | 12.50 | | | | | 12.52 | | | |
| AL $D_{50}$ = 40.4 μm | | | | 12.49 | | | | | 12.56 | |
| AS $D_{50}$ = 20 μm | | | 12.33 | | | | | 11.95 | | |
| BS $D_{50}$ = 5 μm | | | | | 6.02 | | | | | 5.95 |
| Subt. glass beads | 12.48 | 12.50 | 12.33 | 12.49 | 6.02 | 12.54 | 12.52 | 11.95 | 12.56 | 5.95 |

TABLE 2-continued

| aqueous precursor basecoat layer (a) compositions | | | | | | | | | | |
|---|---|---|---|---|---|---|---|---|---|---|
| Sample | #11 | #12 | #13 | #14 | #15 | #16 | #17 | #18 | #19 | #20 |
| Solvents [wt. %] | | | | | | | | | | |
| Water | 6.99 | 7.01 | 7.86 | 7.00 | 3.84 | 7.03 | 7.01 | 7.62 | 7.04 | 3.79 |
| Syrox S900 (*) | 49.01 | 49.21 | 48.91 | 49.27 | 57.41 | 49.36 | 49.21 | 48.95 | 49.39 | 57.21 |
| Syrox S941 (*) | 15.12 | 14.88 | 14.64 | 14.85 | 14.77 | 14.69 | 14.88 | 15.13 | 14.59 | 15.08 |
| Further solvents (§) | 0.26 | 0.26 | 0.27 | 0.26 | 0.13 | 0.25 | 0.26 | 0.26 | 0.26 | 0.13 |
| Subtotal solvents | 71.38 | 71.36 | 71.68 | 71.38 | 76.15 | 71.33 | 71.36 | 71.96 | 71.28 | 76.21 |
| Pigment flakes [wt. %] | | | | | | | | | | |
| Xirallic ® CS 18 μm | 3.00 | 2.99 | 2.95 | 2.98 | 2.99 | | | | | |
| Xirallic ® MS 11 μm | | | | | | 2.98 | 2.97 | 2.96 | 3.02 | 2.99 |
| Subt. pigm. flakes | 3.00 | 2.99 | 2.95 | 2.98 | 2.99 | 2.98 | 2.97 | 2.96 | 3.02 | 2.99 |
| Further ingredients [wt. %] | | | | | | | | | | |
| Acticide ® MBL (#) | 0.02 | 0.02 | 0.02 | 0.02 | 0.01 | 0.02 | 0.02 | 0.02 | 0.02 | 0.01 |
| AMP-Ultra ® PC 2000 (#) | <0.01 | <0.01 | <0.01 | <0.01 | <0.01 | <0.01 | <0.01 | <0.01 | <0.01 | <0.01 |
| ACULYNTM Excel (#) | 0.08 | 0.08 | 0.08 | 0.08 | 0.04 | 0.08 | 0.08 | 0.08 | 0.08 | 0.04 |
| Subt. further ingred. | 0.10 | 0.10 | 0.10 | 0.10 | 0.05 | 0.10 | 0.10 | 0.10 | 0.10 | 0.05 |
| Total composition | 100.00 | 100.00 | 100.00 | 100.00 | 100.00 | 100.00 | 100.00 | 100.00 | 100.00 | 100.00 |

(*) Solvent part of this ingredient
(#) Solids parts of this ingredient
(§) Solvent part of Acticide ® MBL, AMP-Ultra ® PC 2000 and ACULYN ™ Excel

Example 1

All aqueous precursor basecoat layer (a) compositions were applied at ambient temperature (about 20° C.) to planar white metal test plates (10.5×14.9 cm) having a vertical black bar (0.3 cm width) across the surface, using a spray gun (DV1.2 Mini) with a nozzle of 1.2 mm. Two types of layers were applied; 'normal layers' and 'mist layers'. For 'normal layers', the spray gun was positioned 30-40 cm apart from the metal test plates and a pressure of 2.0 bar was applied. For 'mist layers', the spray gun was positioned 40-50 cm apart from the metal test plates and a pressure of 1.5 bar was applied. The mist layer is a very thin layer of droplets (i.e. not a full layer) that is applied first to improve adhesion.

Drying was applied between applying subsequent 'normal layers'. Some aqueous precursor basecoat layer (a) compositions were applied to the metal test plates as a mist layer followed by drying with a subsequent normal layer on top of the mist layer, followed by drying, and by applying a transparent topcoat layer again followed by drying ('single basecoat layer', or '1L'). Other aqueous precursor basecoat layer (a) compositions were applied to the metal test plates as a mist layer with two subsequent normal layers with intermediate drying and final drying, and by applying a transparent topcoat layer again followed by drying ('double basecoat layer' or '2L'). The transparent clearcoat top layer consisted of the clearcoat composition as defined in the section 'Materials'. In summary, the coated substrates consisted of the metal test plate, a mist layer on top of the metal test plate, either one or two layers of basecoat on top of the mist layer and finally a transparent clearcoat top layer.

The compositions of the dried basecoat layers (a) are shown in Tables 3 and 4. Tables 3 and 4 also list the ratio [%] of the median diameter D50 of the pigment flakes to the median particle diameter D50 of the spherical glass beads in the different dried compositions.

TABLE 3

| basecoat layer (a) compositions | | |
|---|---|---|
| Sample | # 4 | # 9 |
| Ratio [%] | 55 | 18 |
| Binder [wt. %] | | |
| Syrox S900 (#) | 36.75 | 36.98 |
| Syrox S941 (#) | 9.13 | 8.79 |
| Subtotal binder | 45.88 | 45.77 |
| Spherical glass beads [wt. %] | | |
| Glass Beads AL – $D_{50}$ = 40.4 μm | 43.34 | 43.53 |
| Subtotal spherical glass beads | 43.34 | 43.53 |
| Pigment flakes [wt. %] | | |
| Iriodin ® Grey 22.3 μm | 10.44 | |
| Iriodin ® Grey Fine Satin 7.2 μm | | 10.36 |
| Subtotal pigments flakes | 10.44 | 10.36 |
| Further ingredients [wt. %] | | |
| Acticide ® MBL (#) | 0.06 | 0.06 |
| AMP-Ultra ® PC 2000 (#) | 0.02 | 0.02 |
| ACULYN ™ Excel (#) | 0.26 | 0.26 |
| Subtotal further ingredients | 0.34 | 0.34 |
| Total composition | 100.00 | 100.00 |

(#) Solids parts of this ingredient

TABLE 4

| basecoat (a) compositions | | | | | | | | | | |
|---|---|---|---|---|---|---|---|---|---|---|
| Sample | #11 | #12 | #13 | #14 | #15 | #16 | #17 | #18 | #19 | #20 |
| Ratio [%] | 90 | 45 | 90 | 45 | 360 | 55 | 27 | 55 | 27 | 220 |
| Binder [wt. %] | | | | | | | | | | |
| Syrox S900 (#) | 36.84 | 36.96 | 37.13 | 37.02 | 51.77 | 37.03 | 36.96 | 37.55 | 37.00 | 51.71 |
| Syrox S941 (#) | 8.74 | 8.61 | 8.55 | 8.58 | 10.25 | 8.48 | 8.61 | 8.94 | 8.42 | 10.49 |
| Subtotal binder | 45.58 | 45.57 | 45.69 | 45.60 | 62.02 | 45.51 | 45.57 | 46.49 | 45.42 | 62.20 |
| Spherical glass beads [wt. %] | | | | | | | | | | |
| CS $D_{50}$ = 20 µm | 43.60 | | | | | 43.76 | | | | |
| CL $D_{50}$ = 40.4 µm | | 43.66 | | | | | 43.71 | | | |
| AL $D_{50}$ = 40.4 µm | | | | 43.64 | | | | | 43.73 | |
| AS $D_{50}$ = 20 µm | | | 43.53 | | | | | 42.62 | | |
| BS $D_{50}$ = 5 µm | | | | | 25.24 | | | | | 25.01 |
| Subt. glass beads | 43.60 | 43.66 | 43.53 | 43.64 | 25.24 | 43.76 | 43.71 | 42.62 | 43.73 | 25.01 |
| Pigment flakes [wt. %] | | | | | | | | | | |
| Xirallic ® CS 18 µm | 10.48 | 10.43 | 10.42 | 10.42 | 12.53 | | | | | |
| Xirallic ® MS 11 µm | | | | | | 10.39 | 10.38 | 10.54 | 10.51 | 12.58 |
| Subt. pigm. flakes | 10.48 | 10.43 | 10.42 | 10.42 | 12.53 | 10.39 | 10.38 | 10.54 | 10.51 | 12.58 |
| Further ingredients [wt. %] | | | | | | | | | | |
| Acticide® MBL (#) | 0.06 | 0.06 | 0.06 | 0.06 | 0.04 | 0.06 | 0.06 | 0.06 | 0.06 | 0.04 |
| AMP-Ultra ® PC 2000 (#) | 0.02 | 0.02 | 0.02 | 0.02 | 0.01 | 0.02 | 0.02 | 0.02 | 0.02 | 0.01 |
| ACUL YNTM Excel (#) | 0.26 | 0.26 | 0.28 | 0.26 | 0.16 | 0.26 | 0.26 | 0.27 | 0.026 | 0.16 |
| Subt. further ingred. | 0.34 | 0.34 | 0.36 | 0.34 | 0.21 | 0.34 | 0.34 | 0.35 | 0.34 | 0.21 |
| Total composition | 100.00 | 100.00 | 100.00 | 100.00 | 100.00 | 100.00 | 100.00 | 100.00 | 100.00 | 100.00 |

(#) Solids parts of this ingredient

LIDAR detectability was determined by scanning the surface of the coated metal test plates with a Livox Tele-15 LIDAR device (Livox Technology Company Co., Ltd) at a wavelength of 905 nm under an angle of about 0 degrees (i.e. in a direction perpendicular to the coated surface). Scanning took place under daylight conditions. The Tele-15 LIDAR device was placed at a distance of about 20 meters from the surface of the coated metal test plates. The Tele-15 LIDAR device calculates reflectivity values for different areas of the surface of the coated metal test plates that is scanned, based on the ratio of reflected laser energy over incident 10 laser energy, and generates a point cloud from these data. Every point in the point cloud has a corresponding reflectivity value between 0 and 255. Reflectivity values between 0 and 155 correspond to reflectivity within the range of 0-100% in the Lambertian reflection model, whereas values between 151 and 255 correspond to retroreflection. Lambertian reflectance is the property that defines an ideal matte or diffusely reflecting surface. The apparent brightness of a Lambertian surface to an observer is the same regardless of the observer's angle of view. Increased Lambertian reflectance of a surface is therefore very relevant in LIDAR applications because it allows the detection of a complete object at different angles of view.

All points in the point cloud having a reflectivity value in the range of 1 to 10 were counted, in the range of 11 to 20, in the range of 21 to 30, and so on, to create a histogram. The number count of each range was subsequently normalized based on the total number of points in the point cloud and expressed as percentage.

Table 5 lists the different coated metal test plates that were tested, the ratio [%] of the median diameter D50 of the pigment flakes to the median particle diameter D50 of the spherical glass beads, the number of basecoat layers (a) applied and the Figure wherein the histogram is shown.

TABLE 5

| LIDAR tests (about 0°) on coated white metal test plates | | | | | | |
|---|---|---|---|---|---|---|
| Example | Basecoat layer | Ratio [%] | Metal plate | Degree [°] | Layers | Figure |
| 1a | #13 | 90 | White | 0 | DL | 1A |
| 1b | #18 | 55 | White | 0 | DL | 1A |
| 1c | #13 | 90 | White | 0 | SL | 1B |
| 1d | #18 | 55 | White | 0 | SL | 1B |
| 1e | #14 | 45 | White | 0 | DL | 1C |
| 1f | #19 | 27 | White | 0 | DL | 1C |
| 1g | #14 | 45 | White | 0 | SL | |
| 1h | #19 | 27 | White | 0 | SL | |
| 1i | #11 | 90 | White | 0 | DL | 1D |
| 1j | #16 | 55 | White | 0 | DL | 1D |
| 1k | #12 | 45 | White | 0 | DL | 1E |
| 1l | #17 | 27 | White | 0 | DL | 1E |
| 1m | #15 | 257 | White | 0 | DL | 1F |
| 1n | #20 | 157 | White | 0 | DL | 1F |

Figure 1B:
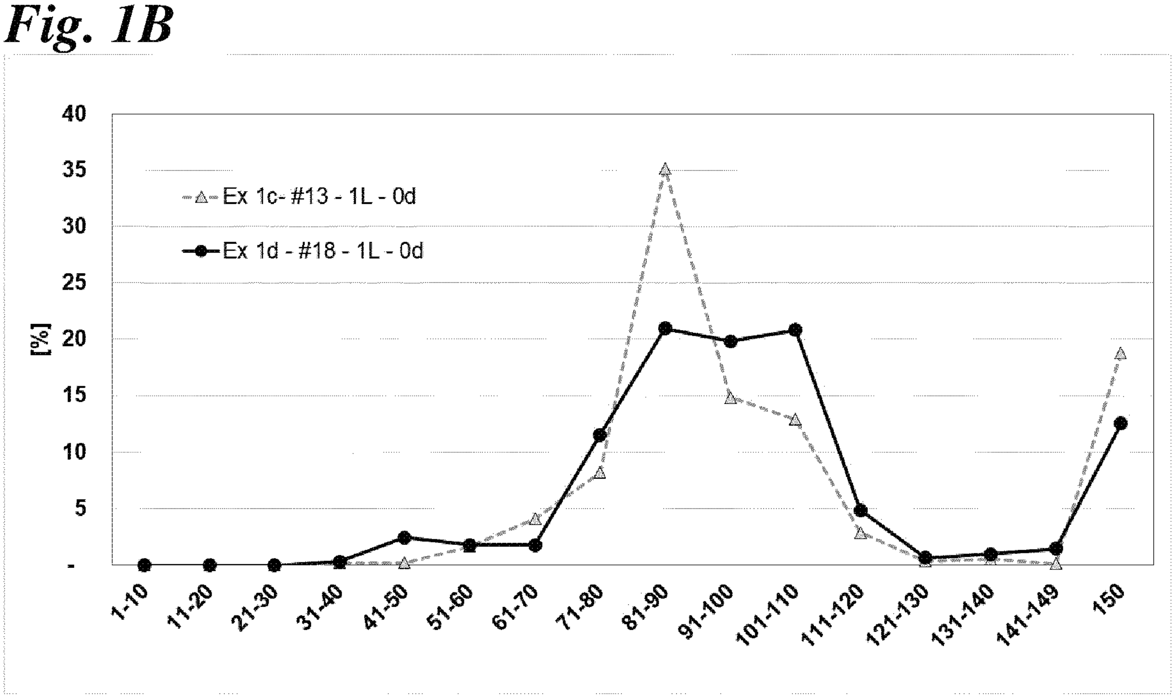
Figure 1C:
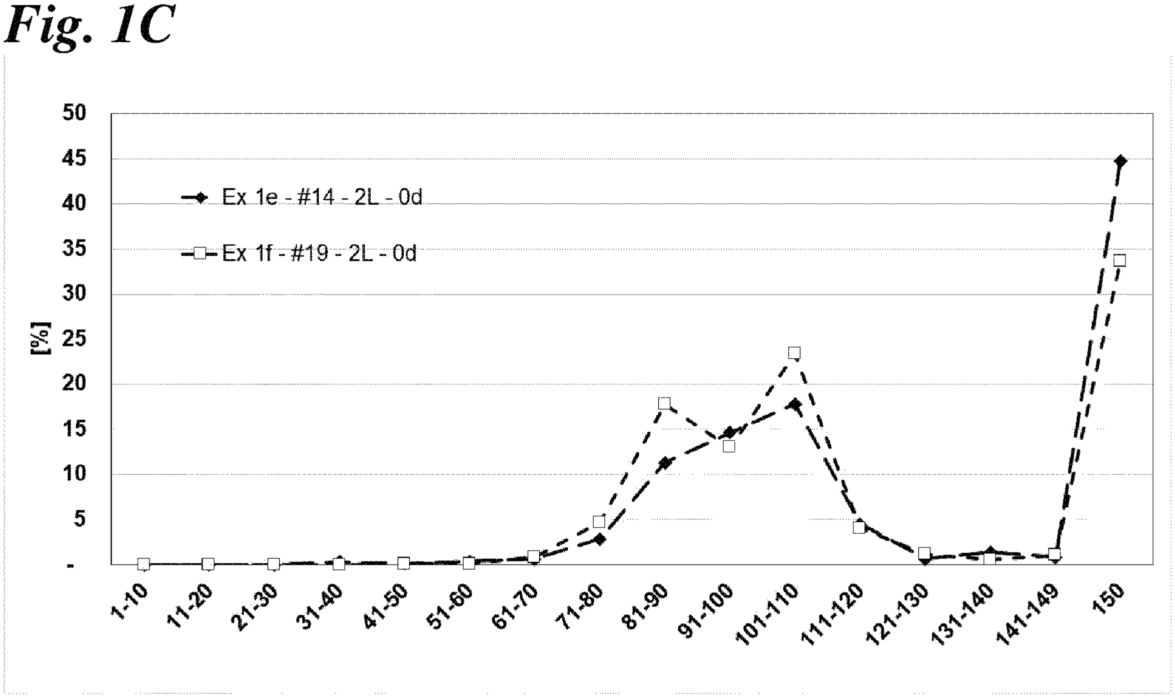
Figure 1D:
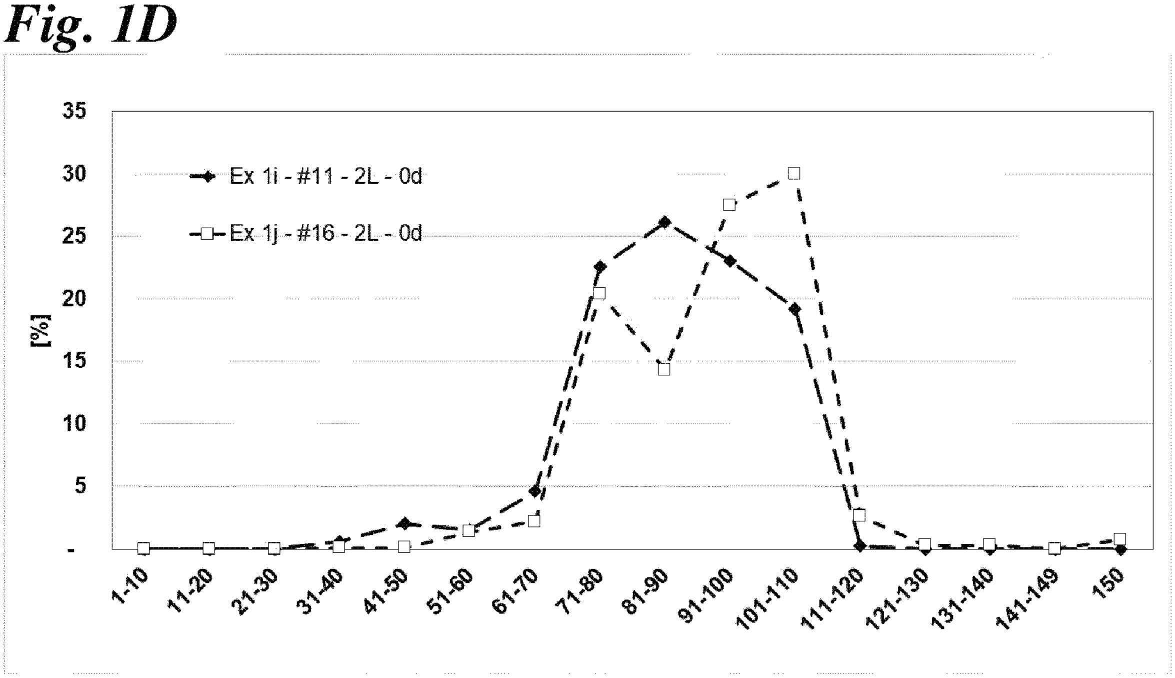
Figure 1E:
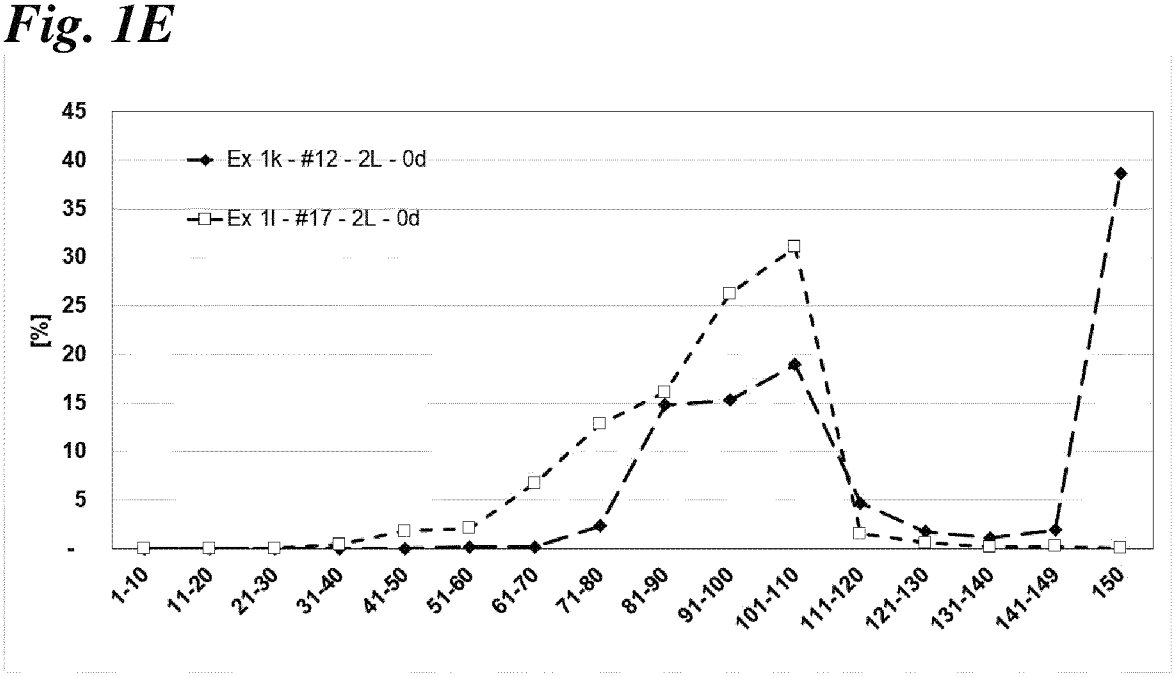
Figure 1F:
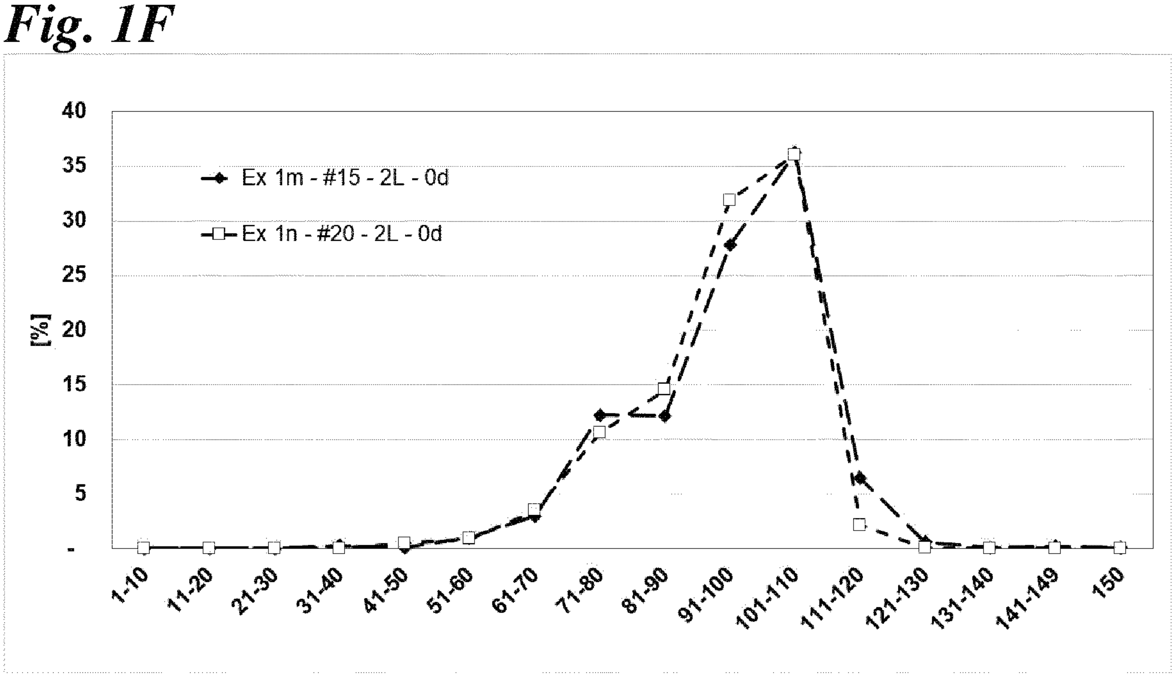

It can be concluded from FIGS. 1A to 1F that all coated metal substrates show considerable LIDAR detectability under an angle of about 0 degrees (i.e. in a direction perpendicular to the coated surface).

The more the 'body' of the histogram shifts to higher reflectivity values, the better the LIDAR detectability of the coated metal substrates. It follows from the individual FIGS. 1A to 1F that the 'body' of the histogram shifts to higher reflectivity values for increased ratios of the median diameter D50 of the pigment flakes to the median particle diameter D50 of the spherical glass beads.

So, the inventors unexpectedly found that LIDAR detectability increases at higher ratios of the median diameter D50 of the pigment flakes to the median particle diameter D50 of the spherical glass beads.

Example 2

LIDAR detectability of coated white metal test plates prepared as described in Example 1 was determined by scanning the surface of the coated metal test plates with a Livox Tele-15 LIDAR device (Livox Technology Company Co., Ltd) at a wavelength of 905 nm under an angle of 15 degrees. Table 6 lists the different coated metal test plates that were tested, the ratio [%] of the median diameter D50 of the pigment flakes to the median particle diameter D50 of the spherical glass beads, the number of basecoat layers (a) applied and the Figure wherein the histogram is shown.

TABLE 6

LIDAR tests (15°) on coated light greyish metal test plates

| Example | Basecoat layer | Ratio [%] | Metal plate | Degree [°] | Layers | Figure |
|---|---|---|---|---|---|---|
| 2a | #13 | 90 | White | 15 | DL | 2A |
| 2b | #18 | 55 | White | 15 | DL | 2A |
| 2c | #13 | 90 | White | 15 | SL | 2B |
| 2d | #18 | 55 | White | 15 | SL | 2B |
| 2e | #14 | 45 | White | 15 | DL | 2C |
| 2f | #19 | 27 | White | 15 | DL | 2C |
| 2g | #14 | 45 | White | 15 | SL | 2D |
| 2h | #19 | 27 | White | 15 | SL | 2D |
| 2i | #4 | 55 | White | 15 | DL | 2E |
| 2j | #9 | 18 | White | 15 | DL | 2E |

Figure 2A:
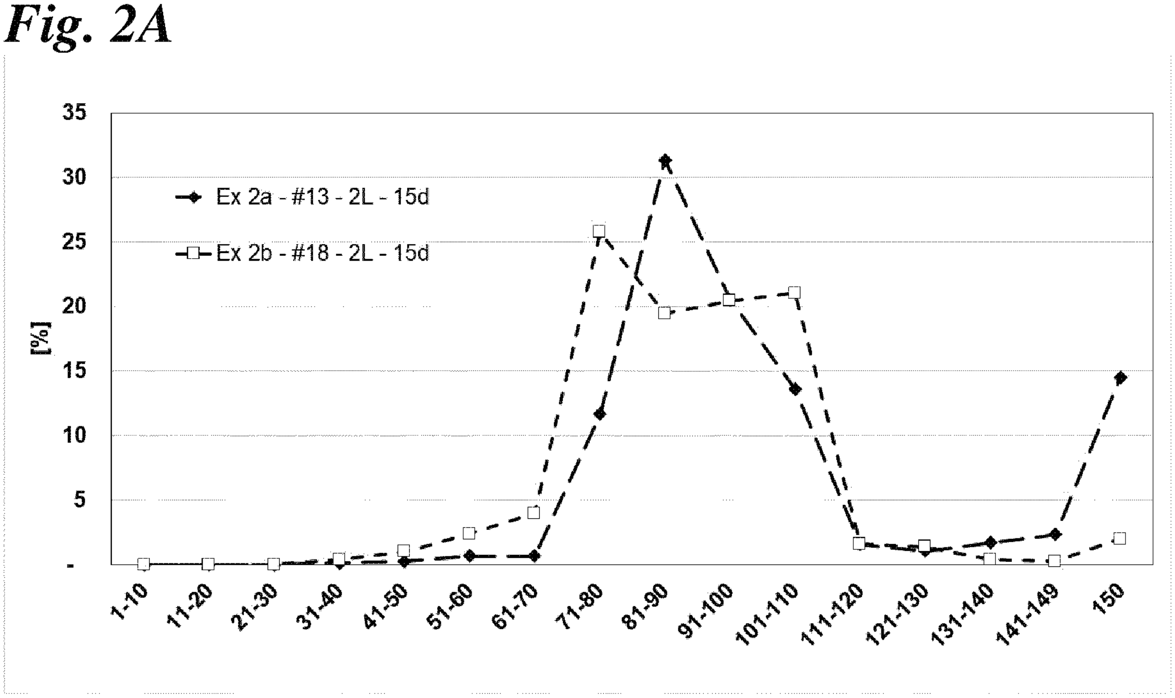
Figure 2B:
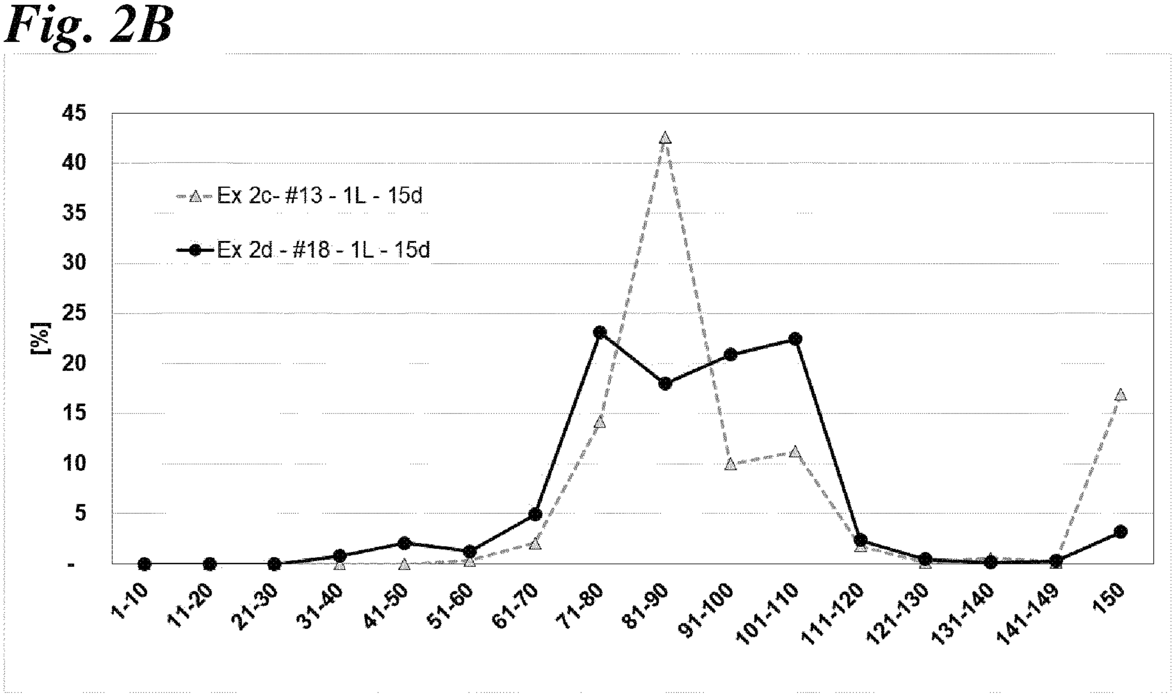
Figure 2C:
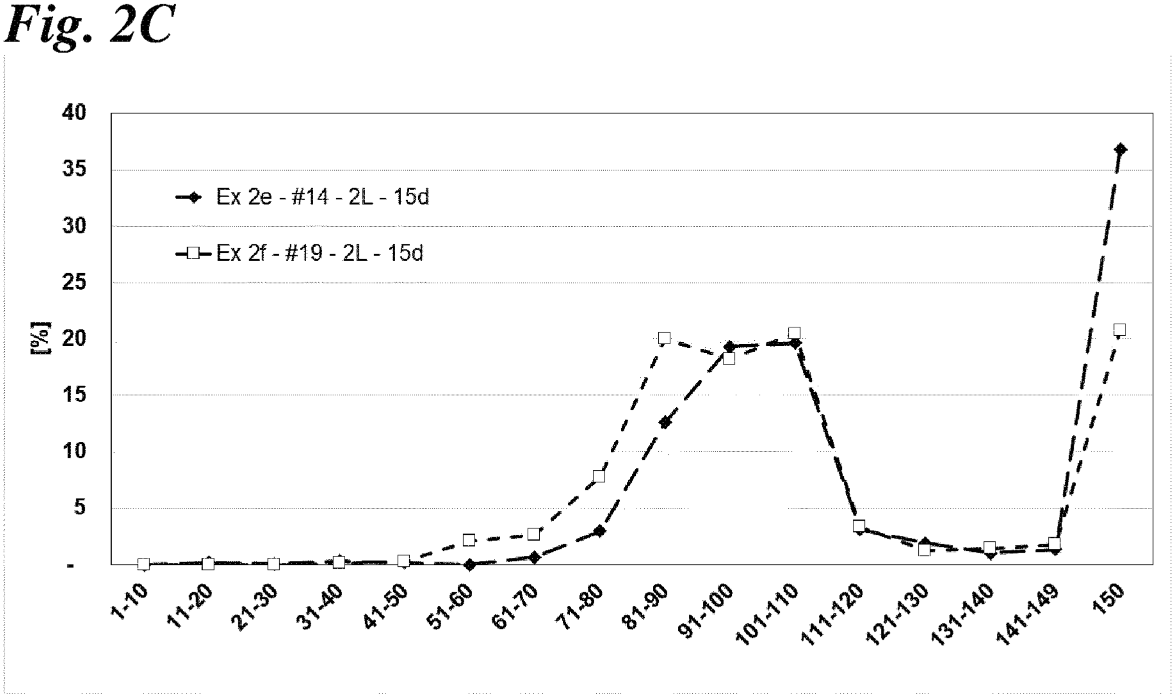
Figure 2D:
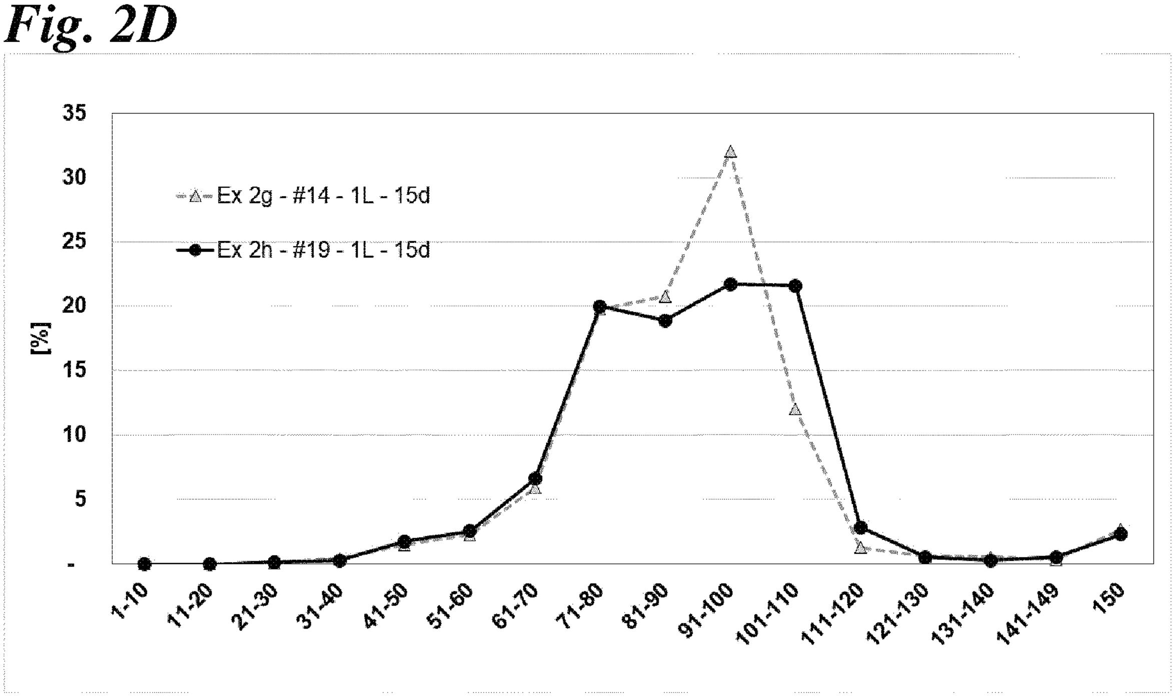
Figure 2E:
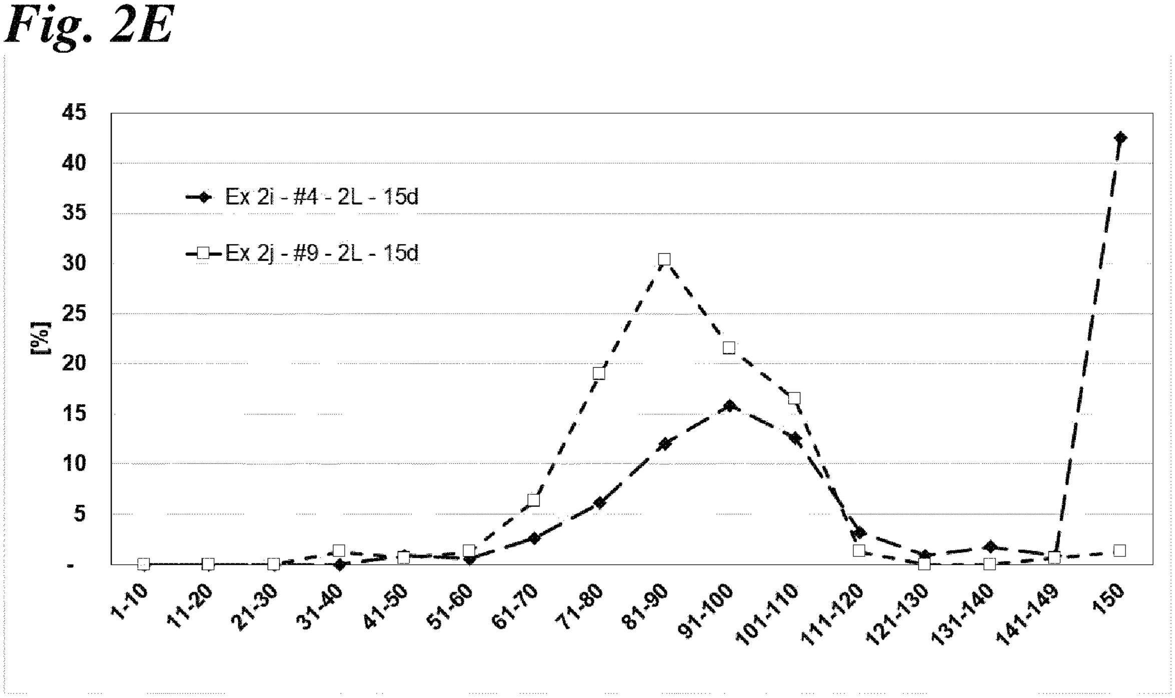

It can be concluded from FIGS. 2A to 2E that all coated metal substrates show considerable LIDAR detectability, even under an angle of 15 degrees. It also follows from the individual FIGS. 2A to 2E that the 'body' of the histogram shifts to higher reflectivity values for increased ratios of the median diameter D50 of the pigment flakes to the median particle diameter D50 of the spherical glass beads. So, the inventors unexpectedly found that LIDAR detectability increases at higher ratios of the median diameter D50 of the pigment flakes to the median particle diameter D50 of the spherical glass beads, even under an angle of 15 degrees.

Example 3

LIDAR detectability of coated metal test plates prepared as described in Example 1, but now on grey metal test plates (10.5×14.9 cm) having a vertical black bar (0.3 cm width) across the surface, was determined by scanning the surface of the coated metal test plates with a Livox Tele-15 LIDAR device (Livox Technology Company Co., Ltd) at a wavelength of 905 nm under an angle of about 0 degrees. Table 7 lists the different coated metal test plates that were tested, the ratio [%] of the median diameter D50 of the pigment flakes to the median particle diameter D50 of the spherical glass beads, the number of basecoat layers (a) applied and the Figure wherein the histogram is shown.

TABLE 7

LIDAR tests (0°) on coated dark greyish metal test plates

| Example | Basecoat layer | Ratio [%] | Metal plate | Degree [°] | Layers | Figure |
|---|---|---|---|---|---|---|
| 3a | #13 | 90 | Grey | 0 | DL | 3A |
| 3b | #18 | 55 | Grey | 0 | DL | 3A |
| 3c | #14 | 45 | Grey | 0 | DL | 3B |
| 3d | #19 | 27 | Grey | 0 | DL | 3B |
| 3e | #15 | 257 | Grey | 0 | DL | 3C |
| 3f | #20 | 157 | Grey | 0 | DL | 3C |
| 3g | #4 | 55 | Grey | 0 | DL | 3D |
| 3h | #9 | 18 | Grey | 0 | DL | 3D |

Figure 3A:
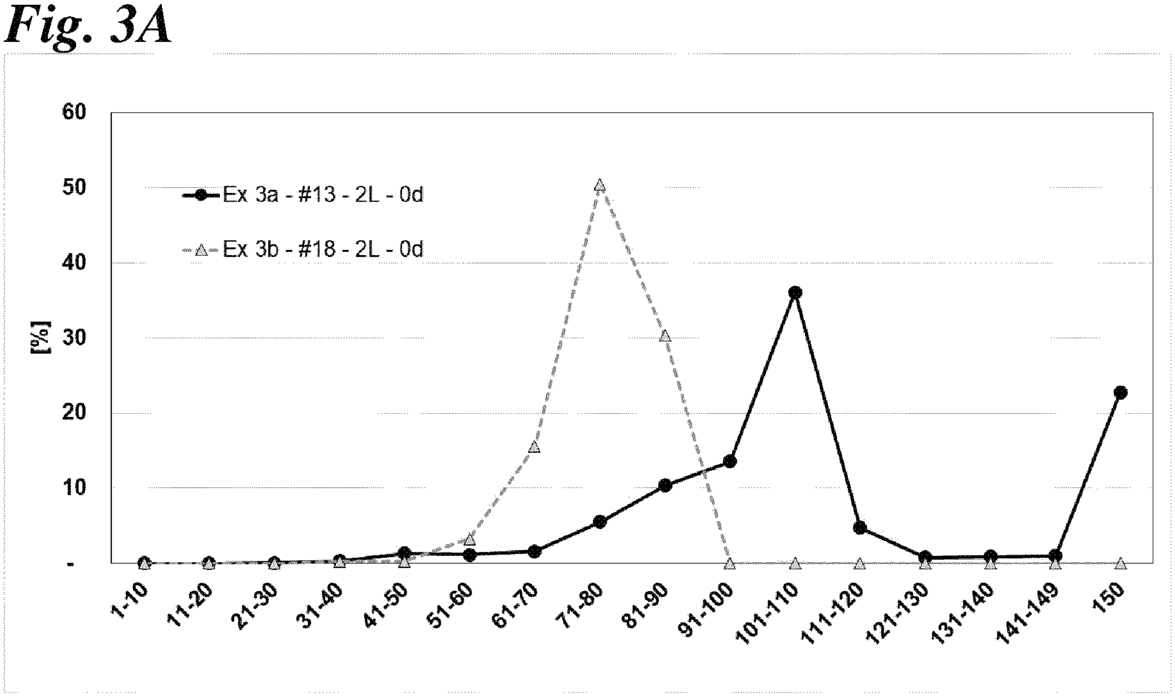
Figure 3B:
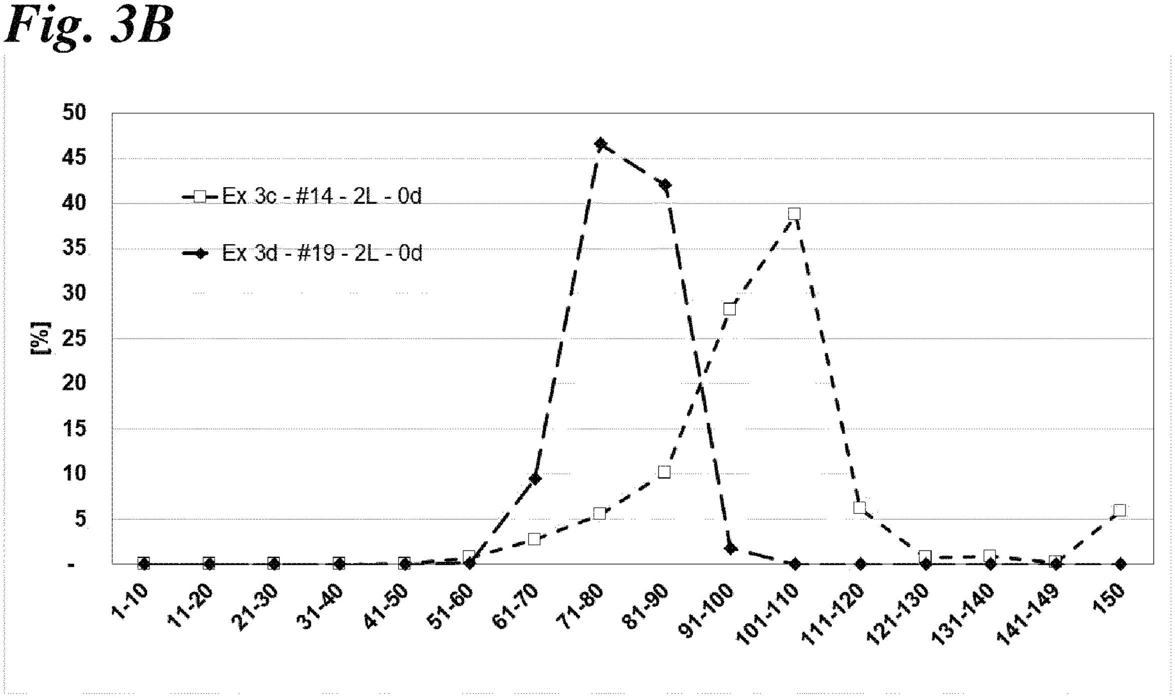
Figure 3C:
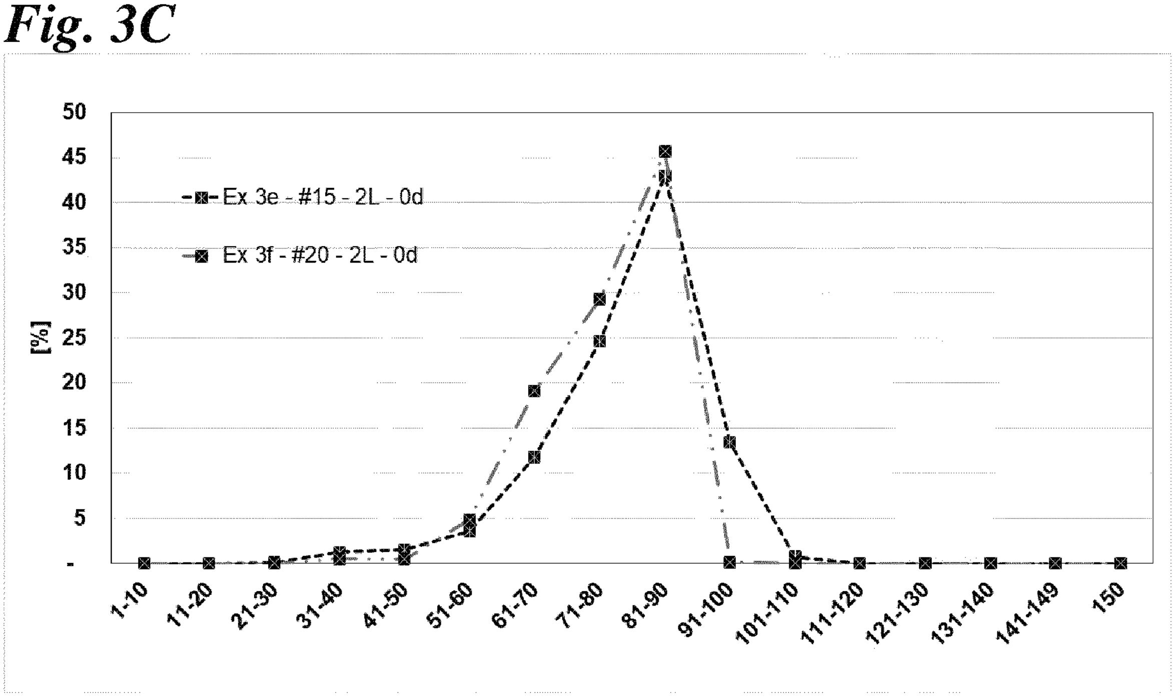
Figure 3D:
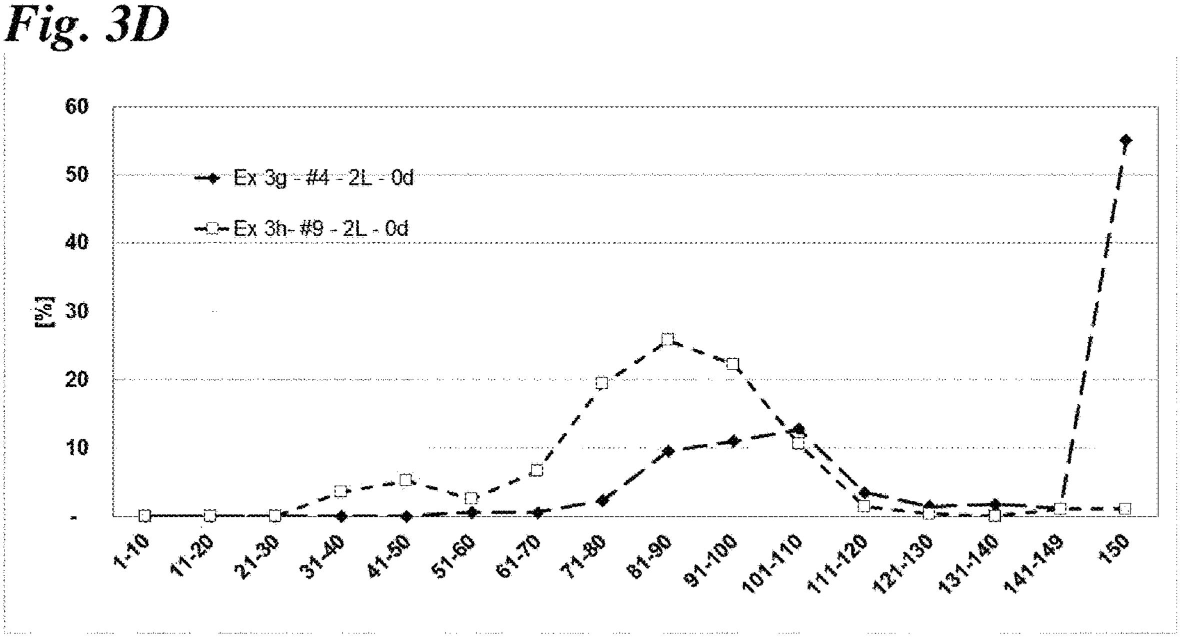

It can be concluded from FIGS. 3A to 3D that all coated metal substrates show considerable LIDAR detectability under an angle of about 0 degrees (i.e. in a direction perpendicular to the coated surface).

It also follows from the individual FIGS. 3A to 3D that the 'body' of the histogram shifts to higher reflectivity values for increased ratios of the median diameter D50 of the pigment flakes to the median particle diameter D50 of the spherical glass beads. It can be inferred from a comparison of FIGS. 1A and 3A, from a comparison of FIGS. 1C and 3B and from a comparison of FIGS. 1F and 3C that this shift is more pronounced when darker substrates are coated.

The invention claimed is:

1. A vehicle having a frame or coachwork, wherein at least part of the outer surface of the frame or coachwork is covered with a coating, said coating comprising at least two layers, wherein the outer two layers are:

a basecoat layer; and a clearcoat top layer on the basecoat layer, wherein the basecoat layer consists of, based on the weight of said basecoat layer:

14.95-98.95 wt. % of binder;

1-85 wt. % of spherical glass beads having: a median particle diameter D50, as measured with laser diffraction, between 1 μm and 150 μm, and a refractive index, measured at a wavelength λ of 589 nm, between 1.7 and 2.8;

0.05-30 wt. % of pigment flakes selected from the group consisting of: metallic pigment flakes, pearlescent pigment flakes, and a combination thereof, said pigment flakes having: a median diameter D50, as measured with laser diffraction, between 2 μm and 75 μm, a thickness smaller than 1 μm, and an aspect ratio (flake diameter/thickness) of at least 10; and 0-30 wt. % of further ingredients, and wherein the median diameter D50 of said pigment flakes is greater than 35% of the median particle diameter D50 of said spherical glass beads.

2. The vehicle according to claim 1, wherein the amount of the pigment flakes in the basecoat layer is 1 part by weight to between 1 and 30 part by weight of the spherical glass beads, 1 part by weight to between 1 and 15 part by weight of the spherical glass beads, or 1 part by weight to between 1 and 10 part by weight of the spherical glass beads.

3. The vehicle according to claim 1, wherein the median diameter D50 of the pigment flakes in the basecoat layer is greater than 36% greater than 38%, greater than 40%, greater than 45%, greater than 50%, greater than 55%, greater than 60%, greater than 70%, greater than 90%, greater than 110%, or greater than 130% of the median particle diameter D50 of the spherical glass beads.

4. The vehicle according to claim 1, wherein the spherical glass beads in the basecoat layer have a refractive index, measured at a wavelength X of 589 nm, between 1.9 and 2.6 or between 2.0 and 2.3.

5. The vehicle according to claim 1, wherein the spherical glass beads in the basecoat layer have a median particle diameter D50, as measured with laser diffraction, between 1.5 μm and 100 μm, between 2 μm and 50 μm, between 2.5 μm and 20 μm, or between 3 μm and 10 μm.

6. The vehicle according to claim 1, wherein the further ingredients in the basecoat layer are selected from the group consisting of: thickeners, foam control agents, luminescent agents, UV-absorbers, preservatives, dyes, curing initiators, organic pigments, and inorganic pigments other than the metallic pigment flakes, the pearlescent pigment flakes, and the combinations thereof.

7. The vehicle according to claim 1, wherein the metallic pigment flakes and the pearlescent pigment flakes are selected from the group consisting of:

metal pigment flakes or mica pigment flakes;

metal pigment flakes or mica pigment flakes coated with at least one layer of one or more components selected from the group consisting of: metal oxides, metals, metal sulphides, titanium suboxides, titanium oxynitrides, FeO(OH), $SiO_2$, $B_2O_3$, $GeO_2$, $MgF_2$, metal alloys, and rare earth compounds;

metal pigment flakes or mica pigment flakes coated with at least one layer of one or more components selected from the group consisting of: metal oxides, metals, metal sulphides, titanium suboxides, titanium oxynitrides, FeO(OH), $SiO_2$, $B_2O_3$, $GeO_2$, $MgF_2$, metal alloys, and rare earth compounds and coated with an outer layer comprising one or more colorants and a binder;

pigment flakes comprising $Al_2O_3$, $SiO_2$, glass, ceramic, graphite, or mica platelets coated with at least one layer of one or more components selected from the group consisting of; metal oxides, metals, metal sulphides, titanium suboxides, titanium oxynitrides, FeO(OH), $SiO_2$, $B_2O_3$, $GeO_2$, metal alloys, and rare earth compounds;

pigment flakes comprising $Al_2O_3$, $SiO_2$, glass, ceramic, graphite, or mica platelets coated with at least one layer of one or more components selected from the group consisting of: metal oxides, metals, metal sulphides, titanium suboxides, titanium oxynitrides, FeO(OH), $SiO_2$, $B_2O_3$, $GeO_2$, metal alloys, and rare earth compounds and coated with an outer layer comprising one or more colorants and a binder;

pigment flakes comprising $Al_2O_3$ platelets doped with one or more components selected from the group consisting of: $TiO_2$, $ZrO_2$, $SiO_2$, $SnO_2$, $In_2O_3$, ZnO, and iron oxide, coated with at least one layer of one or more components selected from the group consisting of; metal oxides, metals, metal sulphides, titanium suboxides, titanium oxynitrides, FeO(OH), $SiO_2$, $B_2O_3$, $GeO_2$, metal alloys, and rare earth compounds; and pigment flakes comprising $Al_2O_3$ platelets doped with one or more components selected from the group consisting of: $TiO_2$, $ZrO_2$, $SiO_2$, $SnO_2$, $In_2O_3$, ZnO, and iron oxide, coated with at least one layer of one or more components selected from the group consisting of: metal oxides, metals, metal sulphides, titanium suboxides, titanium oxynitrides, FeO(OH), $SiO_2$, $B_2O_3$, $GeO_2$, metal alloys, and rare earth compounds and coated with an outer layer comprising one or more colorants and a binder.

8. The vehicle according to claim 1, wherein the total thickness of the basecoat layer is between 1 μm and 300 μm.

9. The vehicle according to claim 1, wherein more than 1%, more than 10%, more than 30%, more than 50%, more than 75%, or more than 90% of the outer surface of the frame or coachwork is covered with the coating.

10. A Laser Imaging Detection And Ranging (LIDAR) process of the vehicle according to claim 1, said process comprising:

providing a LIDAR device comprising a source of electromagnetic radiation and a receiver;

transmitting electromagnetic radiation from the source of electromagnetic radiation of the LIDAR device to the vehicle;

scanning the electromagnetic radiation reflected by the coating of the vehicle by the receiver of the LIDAR device; and computing from the differences between the transmitted electromagnetic radiation and the scanned reflected electromagnetic radiation, one or more of:

the distance between the vehicle and the LIDAR device;

the acceleration of the vehicle;

the deceleration of the vehicle;

the direction of movement of the vehicle;

the speed of the vehicle; or a 3D image of the vehicle.

11. The LIDAR process according to claim 10, wherein the LIDAR uses electromagnetic radiation with a wavelength between 740 nm and 2500 nm, between 750 nm and 1600 nm, of 905 nm, or of 1550 nm.

12. The LIDAR process of claim 10, wherein the LIDAR device further comprises a Global Positioning System (GPS), computing from the differences between the transmitted electromagnetic radiation and the scanned reflected electromagnetic radiation comprises computing from the differences between the transmitted electromagnetic radiation and the scanned reflected electromagnetic radiation as a function of time, or computing the speed of the vehicle comprises computing the speed of the vehicle relative to that of the LIDAR device.

13. A vehicle having a frame or coachwork, wherein at least part of the outer surface of the frame or coachwork is covered with a coating, said coating comprising at least three layers, wherein the outer three layers are:

a basecoat layer;

a tinted clearcoat layer on the basecoat layer; and a clearcoat top layer on the tinted clearcoat layer, wherein the basecoat layer consists of, based on the weight of said basecoat layer:

14.95-98.95 wt. % of binder;

1-85 wt. % of spherical glass beads having: a median particle diameter D50, as measured with laser diffraction, between 1 μm and 150 μm, and a refractive index, measured at a wavelength λ of 589 nm, between 1.7 and 2.8;

0.05-30 wt. % of pigment flakes selected from the group consisting of: metallic pigment flakes, pearlescent pigment flakes, and a combination thereof, said pigment flakes having: a median diameter D50, as measured with laser diffraction, between 2 μm and 75 μm, a thickness smaller than 1 μm, and an aspect ratio (flake diameter/thickness) of at least 10; and 0-30 wt. % of further ingredients, and wherein the median diameter D50 of said pigment flakes is greater than 35% of the median particle diameter D50 of said spherical glass beads.

14. The vehicle according to claim 1, wherein said coating further comprises:

one or more primer layers on the outer surface of the frame or coachwork.

15. The vehicle according to claim 14, wherein said coating further comprises:

one or more first basecoat layers, different from the basecoat layer, on the outer surface of the frame or coachwork or on the one or more primer layers.

16. The vehicle according to claim 15, wherein said coating further comprises:

one or more clearcoat layers or tinted clearcoat layers on the outer surface of the frame or coachwork, on the one or more primer layers, or on the one or more first basecoat layers.

17. The vehicle according to claim 16, wherein the basecoat layer is on the outer surface of the frame or coachwork, on the one or more primer layers, on the one or more first basecoat layers, or on the one or more clearcoat layers or tinted clearcoat layers.

18. The vehicle according to claim 17, wherein said coating further comprises:

a tinted clearcoat layer on the basecoat layer.

19. The vehicle according to claim 18, wherein the clearcoat top layer is on the basecoat layer or on the tinted clearcoat layer.

20. The vehicle according to claim 1, wherein the vehicle is selected from the group consisting of: a car, a lorry, a truck, a bike, a moped, a scooter, a motorcycle, a train, a tram, a boat, a ship, a drone, a skateboard, a missile, a helicopter, and an aircraft.

* * * * *